(12) United States Patent
Raghunath et al.

(10) Patent No.: US 8,253,694 B2
(45) Date of Patent: Aug. 28, 2012

(54) LANGUAGE KEYBOARD

(75) Inventors: Mandayam T. Raghunath, Bangalore (IN); Navneet Nair, Bangalore (IN); Balaji Gopalan, Chennai (IN); Chandramouli Mahadevan, Bangalore (IN)

(73) Assignee: Google Inc., Mountain View, CA (US)

( * ) Notice: Subject to any disclaimer, the term of this patent is extended or adjusted under 35 U.S.C. 154(b) by 939 days.

(21) Appl. No.: 11/833,901

(22) Filed: Aug. 3, 2007

(65) Prior Publication Data

US 2009/0037837 A1 Feb. 5, 2009

(51) Int. Cl.
*G06F 3/041* (2006.01)
(52) U.S. Cl. .......................... 345/173; 345/156; 715/703
(58) Field of Classification Search .................. 345/173, 345/156; 715/703
See application file for complete search history.

(56) References Cited

U.S. PATENT DOCUMENTS

| | | | |
|---|---|---|---|
| 2005/0195171 A1* | 9/2005 | Aoki et al. | 345/172 |
| 2007/0156394 A1* | 7/2007 | Banerjee et al. | 704/10 |
| 2007/0174771 A1* | 7/2007 | Mistry | 715/703 |
| 2007/0277118 A1* | 11/2007 | Kotipalli et al. | 715/780 |
| 2008/0120541 A1* | 5/2008 | Cheng | 715/269 |

* cited by examiner

*Primary Examiner* — Alexander Eisen
*Assistant Examiner* — Viet Pham
(74) *Attorney, Agent, or Firm* — Fish & Richardson P.C.

(57) ABSTRACT

A computer implemented method includes displaying first characters of a language script in a user interface, in response to receiving a selection of a first character, identifying second characters that are each a variant of the first character according to a language rule, displaying the second characters of the language script proximate the selected first character, and in response to receiving a subsequent selection of the selected first character or one of the second characters, displaying the subsequently selected character as an input character in the user interface.

31 Claims, 13 Drawing Sheets

LANGUAGE KEYBOARD

TECHNICAL FIELD

This disclosure relates to text input devices.

BACKGROUND

Letters of language scripts, such as Indic language scripts, share a common structure based on language rules where the language script includes consonants and dependent vowel markers. Letters of such language scripts include symbols representing consonants and symbols representing a combination of consonants and dependent vowel markers. Each consonant can have several possible consonant-dependent vowel marker combinations based on the rules of the language. The alphabets of such language scripts thus often include a first character, such as a consonant, and one or more associated characters that are associated with the first character, such as consonant-vowel combination characters.

A keyboard operatively coupled to a device, such as a computer, can be used to enable a user to input letters of a language script, e.g., English, in a display device, e.g., a screen operatively coupled to the computer. Based on device capabilities, a user can use the keyboard to input letters of a language script other than English. Often, however, such English-style keyboards include fewer keys than the possible number of vowel-consonant combinations of other language scripts, e.g., Indic language scripts.

SUMMARY

Systems, methods and apparatus for a virtual keyboard in a user interface display device. The keyboard displays primary letters of a language script, e.g., consonants of the language script. A user can select one of the primary letters on the keyboard causing the display of one or more secondary letters in the language script, wherein the secondary letters can be variants of the primary letter. The secondary letters can, for example, represent possible combinations of the selected primary letter and dependent vowel markers in the language script. The user can select one of the displayed letters, e.g., either the primary letter or one of the secondary letters as a letter in a word in the language script. The selected letter can be displayed in the user interface.

In an implementation, a computer-implemented method displays first characters of a language script in a user interface. In response to receiving a selection of a first character, second characters that are variants of the selected first character are identified according to a language rule. The second characters of the language script are displayed in the user interface.

In an implementation, software stored in a computer readable medium includes instructions that are configured to cause a processing device to perform the operations of displaying first characters of a language script in a user interface, and, in response to receiving a selection of a first character, displaying second characters of the language script proximate to, e.g., adjacent, the selected first character. Each of the second characters is a variant of the selected first character according to a language rule. Further, in response to receiving a subsequent selection of the selected first character or one of the second characters, the subsequently selected character is displayed an input character in the user interface.

In an implementation, a computer-implemented method displays first letters of an Indic language script in corresponding first objects in a user interface. In response to detecting a first selection of a first object, second letters in corresponding second objects are displayed. Each of the second letters is associated with the first letter corresponding to the selected first object according to a language rule. In response to detecting a subsequent selection of one of the selected first object or one of the second objects, the letter corresponding to the subsequently selected object is displayed in the user interface.

In an implementation, a graphical user interface system includes a keyboard control engine configured to generate a virtual keyboard. The keyboard control engine includes a keyboard rendering module configured to generate primary keyboard objects and secondary keyboard objects selectable by a user input device and generate a virtual keyboard displaying the primary keyboard objects and displaying the secondary keyboard objects adjacent a selected primary keyboard object, a primary letters display module in data communication with the keyboard rendering module and configured to display in each primary keyboard object a corresponding first character of a language script, a language information module in data communication with the keyboard rendering module and configured to identify a selected first character of a selected primary keyboard object and identify second characters that are variants of the selected first character according to a language rule, and a secondary letters display module in data communication with the keyboard rendering module and configured to display in each secondary keyboard object the identified second characters.

The systems and techniques described here can present one or more of the following advantages. The virtual keyboard can enable a user, who is familiar only with the language script of the letters displayed on the virtual keyboard, to enter text. The arrangement of primary letters on the virtual keyboard can correspond to a structure of the language script. In some implementations, the arrangement of the primary letters can be based on letter arrangement structures that are presented to students of the language script when the language script is taught. Thus, the user experience can be enhanced, since the user is familiar with the arrangement of the letters on the virtual keyboard. Since the virtual keyboard accepts text in the user's language script, the user need not be aware of phonetic conversions of a letter in the user's language script from a different language script, e.g., English, to enter text. Further, since the consonants and possible consonant-dependent vowel marker combinations are arranged adjacent to each other, the distance and time required to move a pointing device to select a letter is reduced. Since the characters are nested such that secondary characters that are variants of a primary character are displayed when the primary character is selected, screen space can be conserved.

The details of one or more implementations are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Figure 1:
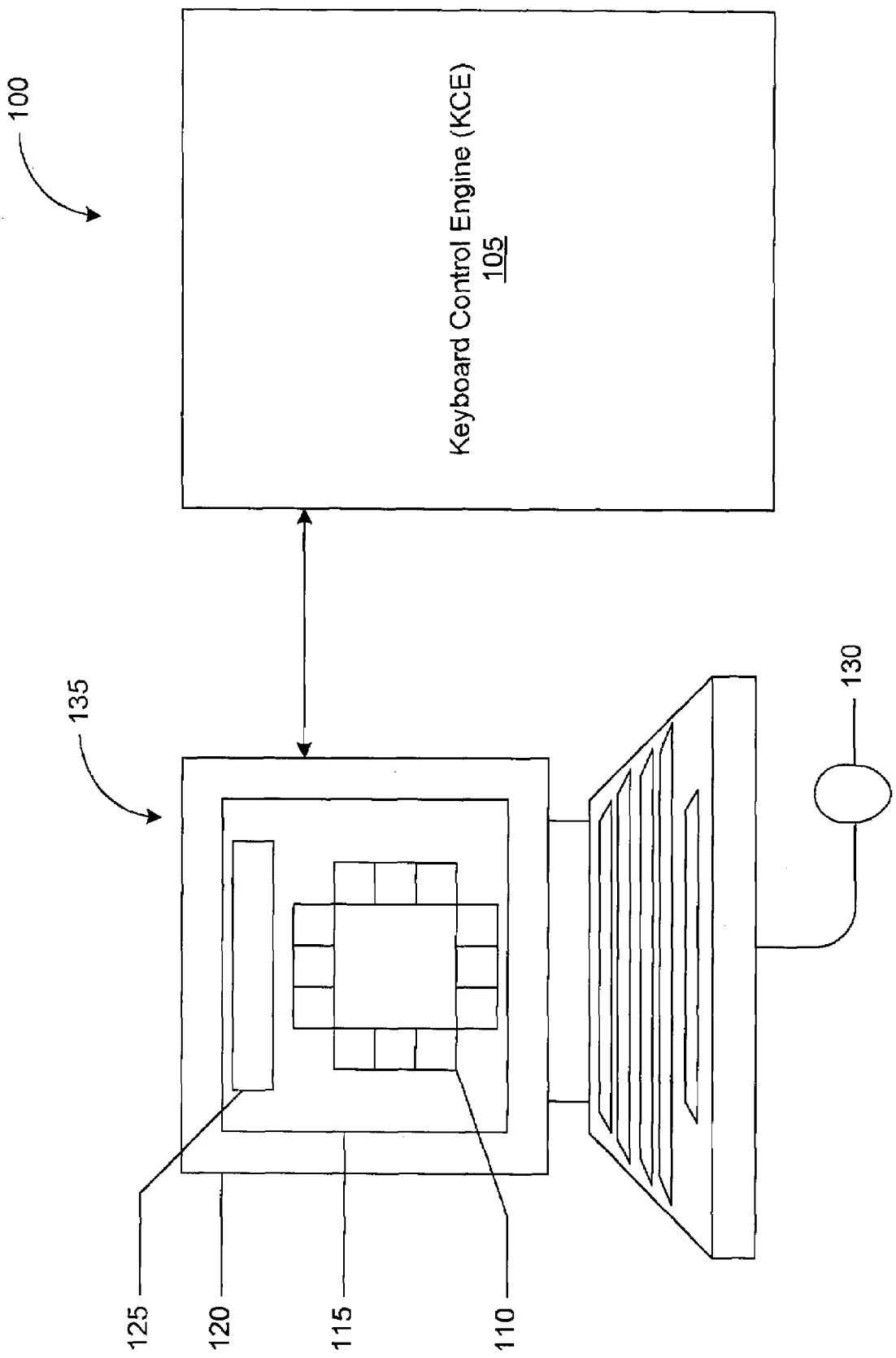
FIG. 1 is a schematic of an example of a system for enabling a user to enter text of a language script.

FIG. 1 depicts a schematic of a system 100 for enabling a user to enter text of a language script, e.g., an Indic language script. Although the example implementations of systems, methods, and apparatus described herein refer to the Indic language script, the systems, methods and apparatus described herein can also be applied to other language scripts having an alphabet defined by first letters and second letters that are variants of the first letters.

In some implementations, the system 100 can include a keyboard control engine (KCE) 105 configured to display an Indic language script virtual keyboard 110 in a user interface 115 on a display device 120. The KCE 105 can be configured to display the letters of the Indic language script in the virtual Indic language script keyboard 110, enable a user to select one or more letters on the keyboard 110, and display the selected one or more letters in the user interface 115. In some implementations, the KCE 105 can be configured to display the selected letters in an interactive display, e.g., a text box 125, in the user interface 115, and enable a user to access the contents of the text box 125 to perform operations, e.g., editing operations including deleting, cutting, copying, pasting, and the like. The system 100 can receive input from one or more input devices, e.g., a pointing device 130 such as a mouse, and/or can include touch-sensitive technology in the display device 120 to facilitate input from a stylus, a user's finger, and the like. The display device 120 and the pointing device 130 can be operatively coupled to each other through wired or wireless interfaces. For example, the display device 120 and the pointing device 130 can be a part of a computer system 135 such as a desktop computer, a laptop computer, a personal digital assistant (PDA), and the like.

The KCE 105 and the display device 120 can be operatively coupled through wired or wireless interfaces. For example, the display device 120 can be operatively coupled to a computer which, in turn, can be operatively coupled to the KCE 105 over a network, such as the internet. In some implementations, the KCE 105 can be implemented in a server device and configured to provide data for display of the user interface 115 and the Indic language script keyboard 110 in a client device, such as web browser, e.g., Internet Explorer, on the display device 120. Other architectures can also be used, e.g., the KCE 105 can be implemented by an applet, a script, or can be implemented as software device within the computer system 135.

In some implementations, the computer device 135 can access the KCE 105 over a network, such as the Internet, by use of a uniform resource locator (URL). When the user enters the URL into a web browser, the Indic language script keyboard 110 can be displayed in a user interface 115 on the display device 120. In some implementations, the user interface 115 can be the web browser and the Indic language script keyboard 110 can be displayed in the web browser as a web page of a web site. In other implementations, the Indic language script keyboard 110 can be displayed in a user interface 115 separate from the web browser. In addition to the Indic language script keyboard 110, the KCE 105 can also be configured to display a text box 125 in the user interface 115.

The Indic language script keyboard 110 can include several keyboard objects, where each object can display a corresponding letter of the Indic language script. Example objects include visual representations of characters, such as a rectangular user interface element that includes a corresponding character, e.g., a virtual key. Other objects can also be used.

The user can select a letter, e.g., for displaying the letter in the text box 125, by selecting an object containing the letter using the pointing device 130. In implementations where the pointing device is a mouse, the user can position a cursor controlled by the pointing device 130 over the object and click the object to select the corresponding letter. In response to the selection, the KCE 105 can display the selected letter in the text box 125. In this manner, the user can select a letter in the Indic language script and display the selected letter on the display device 120. The user can repeat this process to select one or more additional letters to form a word or words in the Indic language script and display the words in the text box 125. The KCE 105 can be configured to enable a user to perform editing operations in the text box 125, such as adding one or more spaces using, e.g., a space bar, deleting one or more letters and spaces, cutting, copying, pasting, and the like. In some implementations, the KCE 105 can be configured to enable a search engine to use the contents of the text box 125 as search terms in a search query. In other implementations, the text box 125 can be a text editor in which a user can enter text in the Indic language script. Alternatively, the text box 125 can be a display unit where the text is displayed in the Indic language script.

A language script can include a character set, created based on the rules of the language, where the character set can include vowels, consonants, dependent vowel markers, and conjunct characters. Consonants can be considered as primary characters with which dependent vowel markers can be combined. A consonant can be combined with dependent vowel markers to create secondary characters, wherein each combination can have a unique representation and can produce a unique sound. A conjunct character can be created by the combination of a vowel-free consonant and another consonant. A vowel-free consonant is a consonant, which, when pronounced, is void of the trailing vowel sound. As an analogy, when the consonant "k," in the English language script is pronounced without the trailing "a" sound, then the resulting character is the vowel-free consonant representation of the letter "k." Each consonant in the Indic language script can be uniquely represented by a corresponding vowel-free consonant. In some implementations, the secondary characters can include combinations of consonants with dependent vowel markers as well the vowel-free consonant representation of the primary character with which the secondary characters are associated. In some implementations, the secondary character representing the vowel-free consonant form of the primary character can be termed a half primary character.

Figure 2A:
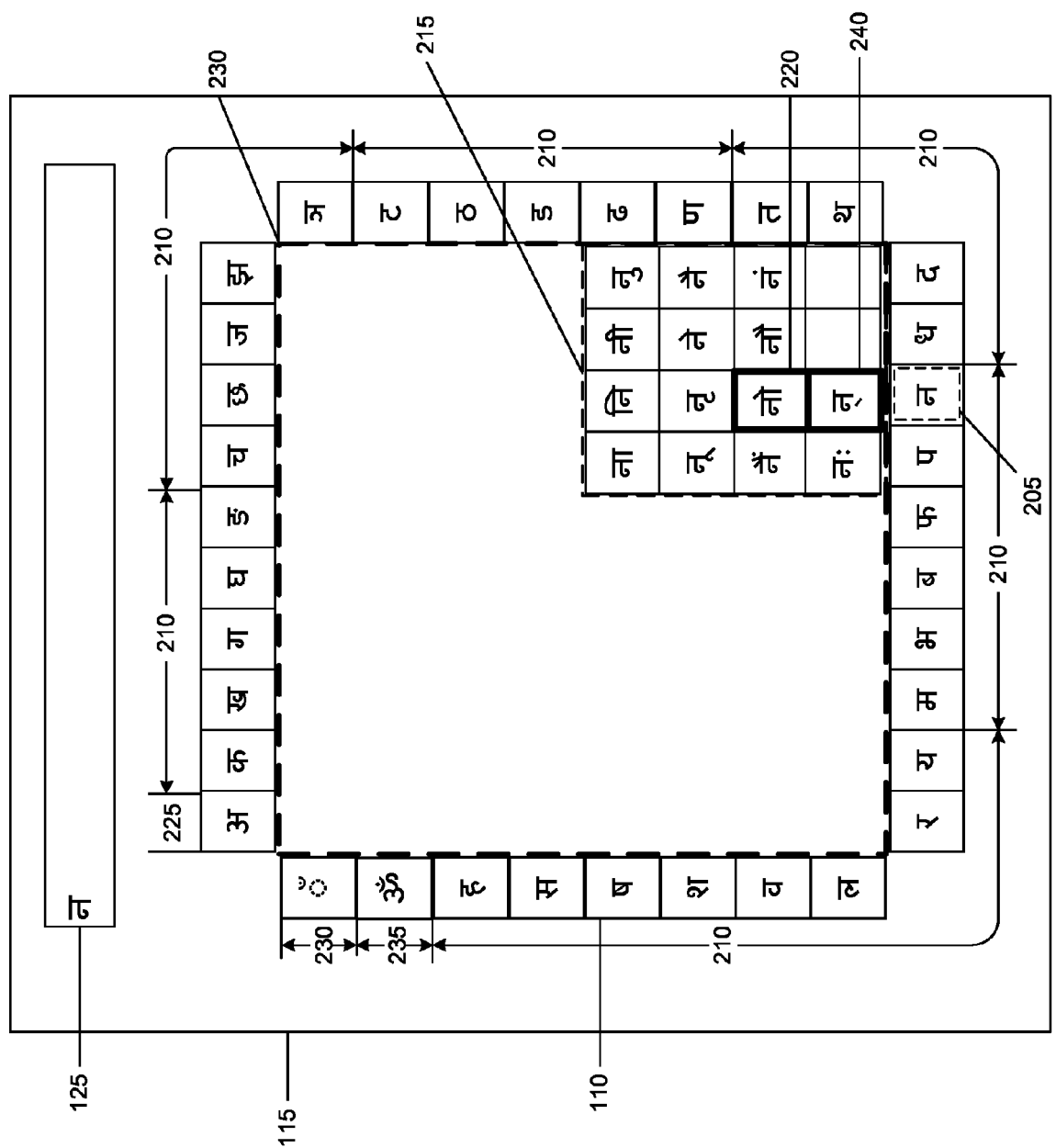
FIGS. 2A and 2B are schematics of examples of virtual keyboards for entering text in an Indic language script.

FIG. 2A depicts a schematic of a user interface 115 including an Indic language script keyboard 110 displaying letters in the Indic language script, Hindi. In some implementations, the KCE 105 can be configured to display each letter of Hindi in a corresponding object, e.g., object 205, in the user interface 115. Based on language rules of Hindi, the letters can be divided into first letter, e.g., primary letters, and secondary letters. An example language rule defines consonant and dependent vowel marker combinations. For example, letters in Hindi can be divided into consonants and letters whose representations are variants of the consonant based on combinations of the consonant and dependent vowel markers that are added to consonants, where each consonant can be associated with one of the multiple dependent vowel markers. Since combining the dependent vowel marker with the consonant causes a variation in the sound of the consonant-dependent vowel marker combination, the secondary letter can be a variant of the primary letter. Each consonant and each dependent vowel marker can be represented by a unique letter, such that the representation of a combination of a consonant with a first dependent vowel marker is distinct from that of the consonant and a second dependent vowel marker. Further, the representation of a combination of a first consonant with a dependent vowel marker is distinct from that of a second consonant with the same dependent vowel marker.

Other language rules can also be used. For example, a language rule defining combinations of independent vowels and corresponding dependent vowel markers can be used. Accordingly, the first character may be an independent vowel, and the second characters may be variants of the independent vowel based on dependent vowel marker combinations. By way of another example, a language rule can relate to the graphemes of the language, i.e., the minimal units of the written language, such as characters. An example grapheme language rule can define secondary characters that are variants of a first character. Other language rules can also be used, such as grammar rules, rules based on sentence structure and/or context, etc.

In some implementations, the KCE 105 can be configured to display all the consonants as primary letters in corresponding primary objects 205. In addition, the KCE 105 can be configured to display secondary letters, representing combinations of a consonant with each of the multiple dependent vowel markers, in corresponding secondary objects. In some implementations, the KCE 105 can be configured to display the Indic language script keyboard 110 for entering Hindi letters in the text box 125 in the user interface 115 by circumferentially arranging the primary objects 205 to define a region 230, which can be rectangular. The size of the rectangular region 230 can depend on the number of primary objects 205, which, in turn, depends on the number of primary letters in the Indic language script being displayed.

In some implementations, the primary letters are combined into primary letter groups based on the rules of the language. For example, Hindi can include multiple primary letter groups, which, in addition to being based on the rules of Hindi, represent a conventional manner in which Hindi is taught. The KCE 105 can be configured to group the primary objects 205 displaying the letters in primary letter groups to form primary object groups 210 and to display all primary letters of the same primary letter group 210 in corresponding objects positioned adjacent to each other. In some implementations, not all primary objects 205 belonging to the same primary object group 210 need be positioned along the same side of the region 230. Alternatively, in some implementations, the KCE 105 can be configured to automatically alter the dimensions of the region 230 to display all primary objects 205 in the same primary object group 210 along the same side of the circumferential region 230. In some implementations, the primary object groups 210 can be arranged along less than all the sides of the region 230 leaving all, or portions of, one or more sides of the region blank. In addition, the KCE 105 can be configured to display the same highlighting in all the objects of a primary object group 210. For example, all objects of a primary object group 210 can be filled with the same color.

In some implementations, as illustrated in FIG. 2A, a user can position a cursor on one of the primary objects 205 to select the primary letter in the primary object. The KCE 105 can be configured to display a secondary object group 215 proximate to the selected primary object 205 in response to the selection. In one implementation, the secondary object group 215 is displayed adjacent the selected primary object 205. In this manner, the selection of a primary object displaying a primary character can be a pre-selection that can cause the display of secondary objects displaying secondary characters that are variants of the primary character. The secondary object group 215 includes multiple secondary objects 220 displaying secondary letters, which are, for example, possible combinations of the consonant displayed in the selected primary object 205 and the dependent vowel markers in Hindi. In addition, the secondary object group 215 can include the half primary character representation of the primary character with which the displayed secondary characters are associated. In some implementations, the KCE 105 can be configured to arrange the multiple secondary objects 220 of the secondary object group 215 in an array. For example, as illustrated in FIG. 2A, the secondary objects 220 are arranged in a 4×4 array, where 14 of the 16 objects in the array display secondary letters that are variants of the selected primary letter. The user can manipulate the position of the cursor using, e.g., the pointing device 130 such as a mouse. The KCE 105 can be configured to determine that the position of the cursor is over that of a primary object 205, and in response to the determination, display the secondary object group 215 associated with the primary object 205 in the user interface 115. In some implementations, the secondary object group 215 is displayed adjacent the selected primary object 205. In this manner, a user can cause the display of secondary letters that are variants of a primary letter according to a language rule in the user interface 115 by positioning the cursor over the primary letter. In such implementations, the user need not click the mouse to select a primary object. Further, the secondary object group 215 displayed can be positioned such that none of the primary objects 205 on the keyboard 110 are hidden when the secondary object group 215 is displayed.

The user can choose one of the secondary letters by selecting a secondary object in the secondary object group 215 displaying a secondary letter in the displayed secondary object group 215, e.g., the secondary object 220. Alternatively, the user can choose the primary letter, with which the displayed secondary letters are associated, by selecting the corresponding primary object 205 using the pointing device 130. For example, the user can position the cursor on one of the primary object 205 or the secondary object 220 and click the mouse. In this manner, subsequent to pre-selecting a primary object 205 to display a secondary object group 215, the user can select one of the secondary objects in the displayed secondary object group 215.

In some implementations, the KCE 105 can be configured to highlight the object selected by the user to enable the user to view the selected letter. For example, when the user selects an object, e.g., by positioning the cursor over the object, the KCE 105 can fill the selected object with a color that is easily discerned from the remaining colors displayed in the user interface 115. Further, the KCE 105 can remove the easily discernible color from an object once the user moves the cursor away from the object. For example, when the user positions the cursor over an object and clicks the mouse, the object can be filled with a red color. The color of the object can remain red as long as the user has the cursor over the object. Alternatively, the color of the object can remain red as long as the user has the mouse button pressed. Once the user releases the mouse button, the red color can be removed from the selected object.

The KCE 105 can be configured to recognize the selection and display the letter displayed in the selected object in the text box 125. As shown in FIG. 2A, the character associated with the primary object 205 has been selected and input into the text box 125. Further, the KCE 105 can enable the user to alter the letter displayed in the text box 125. If the highlighted object does not correspond to the letter that the user wished to select, e.g., the user accidentally selected a different letter, then the user can delete the letter displayed in the text box 125 and re-select another letter. In some implementations, the user can delete the letter in the text box 125 using, e.g., the "Delete" key, the "Backspace" key on a keyboard, or any method used in text editing. In this manner, the KCE 105 can enable a user to enter into a text box 125 in the user interface 115, either a consonant or a combination of a consonant and a dependent vowel marker in the Hindi language script.

In other implementations, the user interface 115 can incorporate modal states dependent on mouse clicks, e.g., a first mouse click on a primary object 205 can pre-select the primary object 205 and cause the secondary object group 215 to be displayed, and a second click on one of the secondary objects 215 or the primary object 205 can cause the corresponding letter to be selected for display in the text box 125. Other selection schemes can also be used.

Figure 2B:
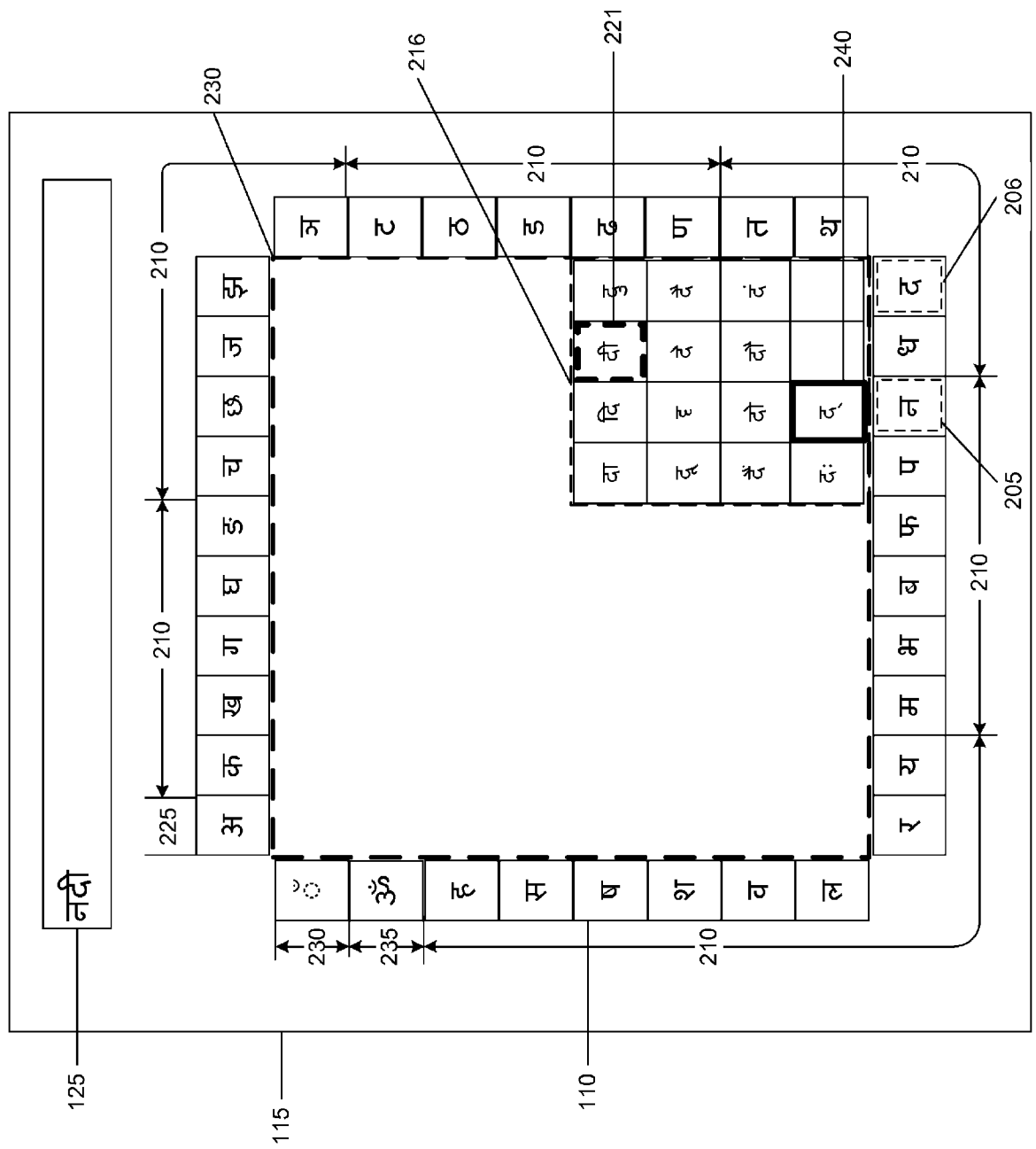

FIG. 2B depicts a schematic of a user interface 115 including a Hindi keyboard 110 to enable a user to enter a second Hindi letter into the text box 125 after a first Hindi letter has been entered. In some implementations, the KCE 105 can be configured to display the secondary object group 216, associated with a selected primary object 206, adjacent to the selected primary object 206 within the region 230. The KCE 105 can display the secondary object group 216 upon detecting the positioning of a cursor over a corresponding primary object 206. When the user moves the cursor from a first primary object 205 to a second primary object 206 to select the second primary object 206, the KCE 105 can hide the secondary object group 215 associated with the first primary object 205 from display, and display the secondary object group 216 associated with the second primary object 206 in the region 230. In this manner, the re-positioning of the cursor from a first primary object 205 to a second primary object 205 can be the de-selection of the first primary object 205. When the first primary object 205 is de-selected, the secondary objects group 215 corresponding to the first primary object 205 is removed from display. In some implementations, when the user moves the cursor from over the primary object 205 to a position away from the keyboard 110, the primary object 205 can be de-selected and the corresponding secondary objects group 215 can be hidden from display. Subsequently, a user can select either the second primary object 206 or a secondary object, e.g., secondary object 221 from the secondary object group 216 associated with the second primary object 206. The KCE 105 can recognize the selection and display the selected letter in the text box 125. In this manner, a user can select multiple letters for display in the text box 125. The KCE 105 can further be configured to enable the user to enter spaces between letters, e.g., using a "Spacebar" on a keyboard operatively coupled to the display device 120, in the text box 125.

A user can thus select multiple letters from the Hindi keyboard 110 to form words, and enter one or more words in the text box 125. The user can edit the words, e.g., by adding or deleting letters, adding or removing spaces between letters, and the like. In some implementations, the KCE 105 can enable the user to use the letter, letters, word, or words displayed in the text box 125 as search terms in a search query. The KCE 105 can either include or be operatively coupled to a search engine and can display in the user interface 115 control buttons (not shown) that a user can select subsequent to entering the search term to initiate a search for the search terms using the search engine. The control buttons can display text, also in the Indic language script, that inform the purpose of the control button to the user.

In some implementations, characters can be displayed according to one or more language rules. For example, in Indic language scripts, such as Hindi, the first letter of a word can be a consonant, where the first letter of the word can be represented either by the consonant alone or by a combination of one of the dependent vowel markers with the consonant. The KCE 105 can enable a user to enter such words into the text box 125, one letter per selection, using the primary objects 205 and secondary objects 220 corresponding to the primary objects 205. Alternatively, the first letter or any other letter of a word can be a vowel. Thus, the Hindi keyboard 110 can also include a vowel group object 225, using which a user can enter Hindi vowels in the text box. The KCE 105 can be configured to display, within the region 230, all the vowels in Hindi when the user positions the cursor over the vowel group object 225. Each vowel can be displayed in corresponding vowel objects that represent vowels in Hindi. The vowel objects can also be represented as an array of objects in which the number of objects in the array depends on the number of vowels, and where not all the objects in the array need display a vowel. The KCE 105 can thus detect that a user has selected a vowel object, and, in response to the selection, display the selected vowel in the text box 125.

In some implementations, the keyboard 110 can include a miscellaneous object 230 that can represent, for example, a symbol of the Indic language script that can be associated with any letter of the Indic language script including any primary letter, secondary letter, vowel, and conjunct character. When a user selects a character for inclusion in the text box 125 and selects the miscellaneous object 230, the miscellaneous object can be combined with the character in the text box 125. The combination of the character in the text box 125 and the miscellaneous character 230 can have a unique representation and a unique sound when pronounced. In some implementations, the keyboard 110 can include stand alone objects 235 that can be included in the text box 125 when clicked. In some implementations, one of the characters displayed in the secondary objects of the secondary objects group can be the half primary character representation 240 that can be used as the vowel-free consonant in a conjunct character. For example, the user can select the half primary character representation causing the vowel-free character to be included in the text box 125. Subsequently, when the user selects either a primary or a secondary character, the KCE 105 can recognize that the character prior to the selected primary or secondary character is the vowel-free character, and combine the vowel-free character with the selected primary or secondary character to alter the character in the text box 125 to display the conjunct character.

Figure 3A:
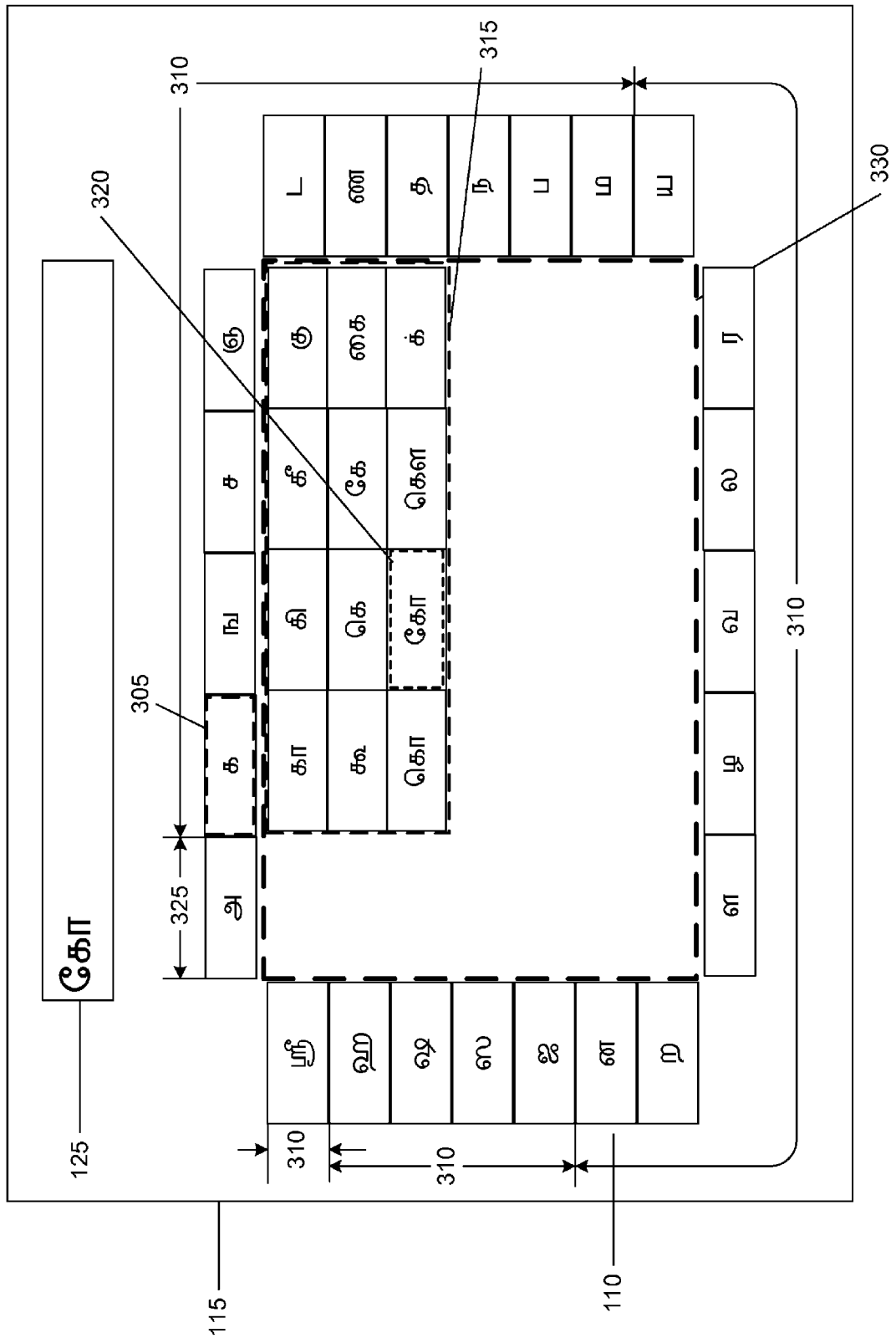
FIGS. 3A and 3B are schematics of examples of virtual keyboards for entering text in an Indic language script.
Figure 3B:
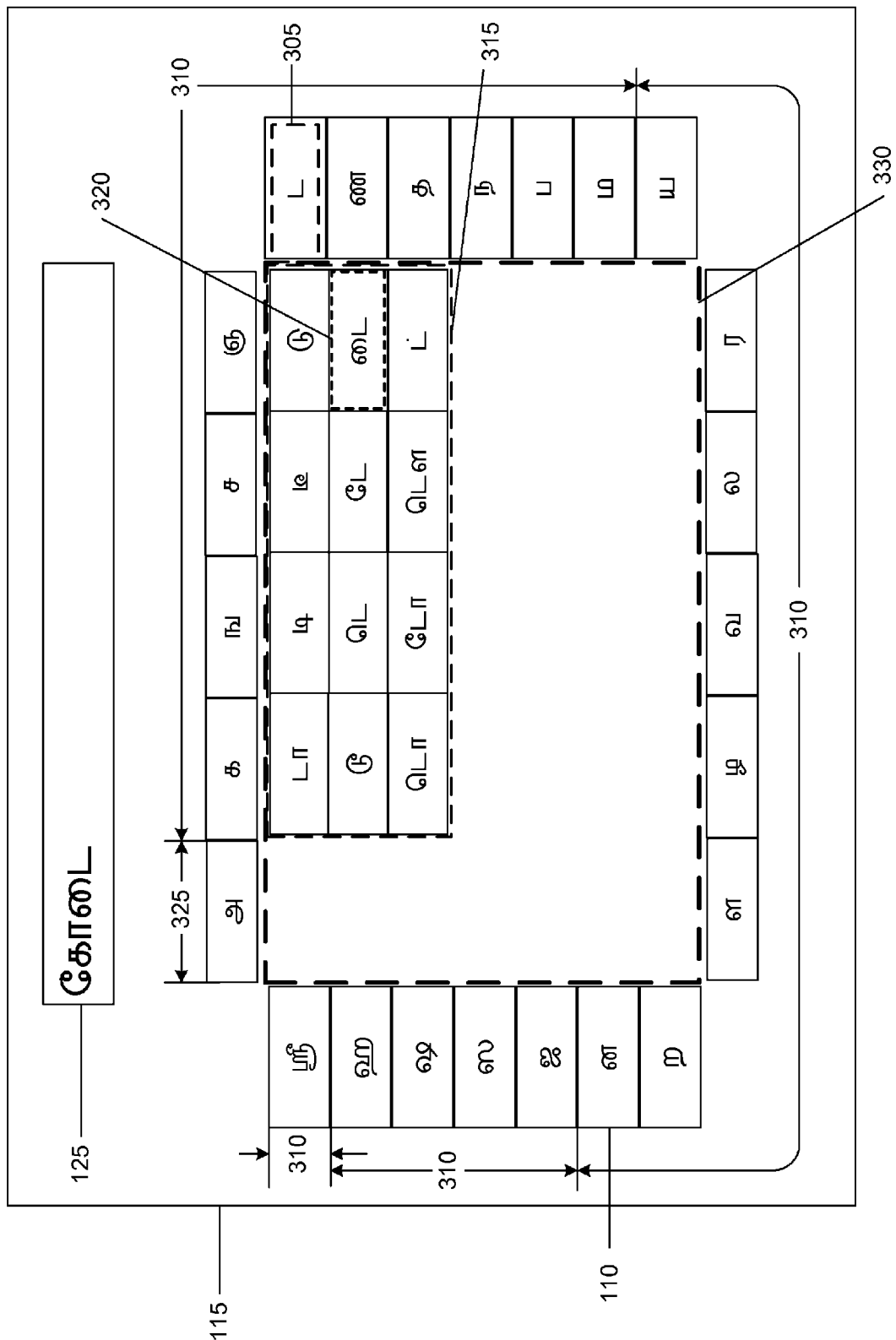

FIGS. 3A and 3B depict schematics of a user interface 115 displaying a keyboard 110 to enable a user to enter text in the Indic language script, Tamil. The keyboard 110 includes multiple primary objects 305, where each primary object 305 displays a primary letter in the Tamil language script. One or more primary objects 305 are grouped to form multiple primary object groups 310, based on the language rules of Tamil. The primary object groups 310 are arranged along the sides of a region 330. When a user selects a primary object 305 by positioning a cursor on one of the primary objects 305, a secondary object group 315 corresponding to the selected primary object 305 is displayed within the region 330. The secondary object group 315 can include one or more secondary objects 320 that can display secondary letters that represent a combination of the primary letter in the selected primary object 305 with a dependent vowel marker. The user can select either the primary letter or one of the displayed secondary letters using the pointing device 130, e.g., by placing the cursor on the object corresponding to the user's choice and clicking the mouse. In response, the selected letter can be displayed in the text box 125. Subsequently, the user can position the cursor over a second primary object 305. In response to the change in position, the secondary object group 315 comprising the secondary objects 320 corresponding to the selected second primary object 305 can be displayed within the region 330. The user can select the letter displayed in one of the displayed secondary objects 320 or the second primary object 305 for inclusion to the letter already displayed in the text box 125. In this manner, the user can enter Tamil letters into the text box 125.

The Tamil keyboard 110 can include a vowels group object 325 which, when selected by a user, can cause a group of vowels objects to be displayed within the circumferential region 330. The vowel objects can also be represented as an array of objects where the number of objects in an array depends on the number of vowels, and where not all the objects in the array need display a vowel. A user can select a vowel object to include the vowel displayed in the object, in the text box 125.

In some implementations, the keyboard 110 can include one or more miscellaneous group objects that can correspond to miscellaneous letters of Tamil that fall outside the parameters of the primary letter, the secondary letter, and the vowels, e.g. letters governed by other language rules of the Indic language. When a user selects a miscellaneous group object, the miscellaneous letters of the Tamil language script can be displayed in corresponding objects. A user can select one of the miscellaneous letters for inclusion in the text box 125. Depending on the language script, a miscellaneous object can display a letter. Alternatively, the miscellaneous object can represent a combination of the primary letter with one or more symbols of the language script, such as symbols that are not included in the dependent vowel markers, and where the combination of a primary letter with one of the symbols is a unique representation of the primary letter. In addition, the keyboard 110 can include stand alone objects 310 that can display stand alone characters which, when clicked by a user, can be included in the text box 125.

Figure 4:
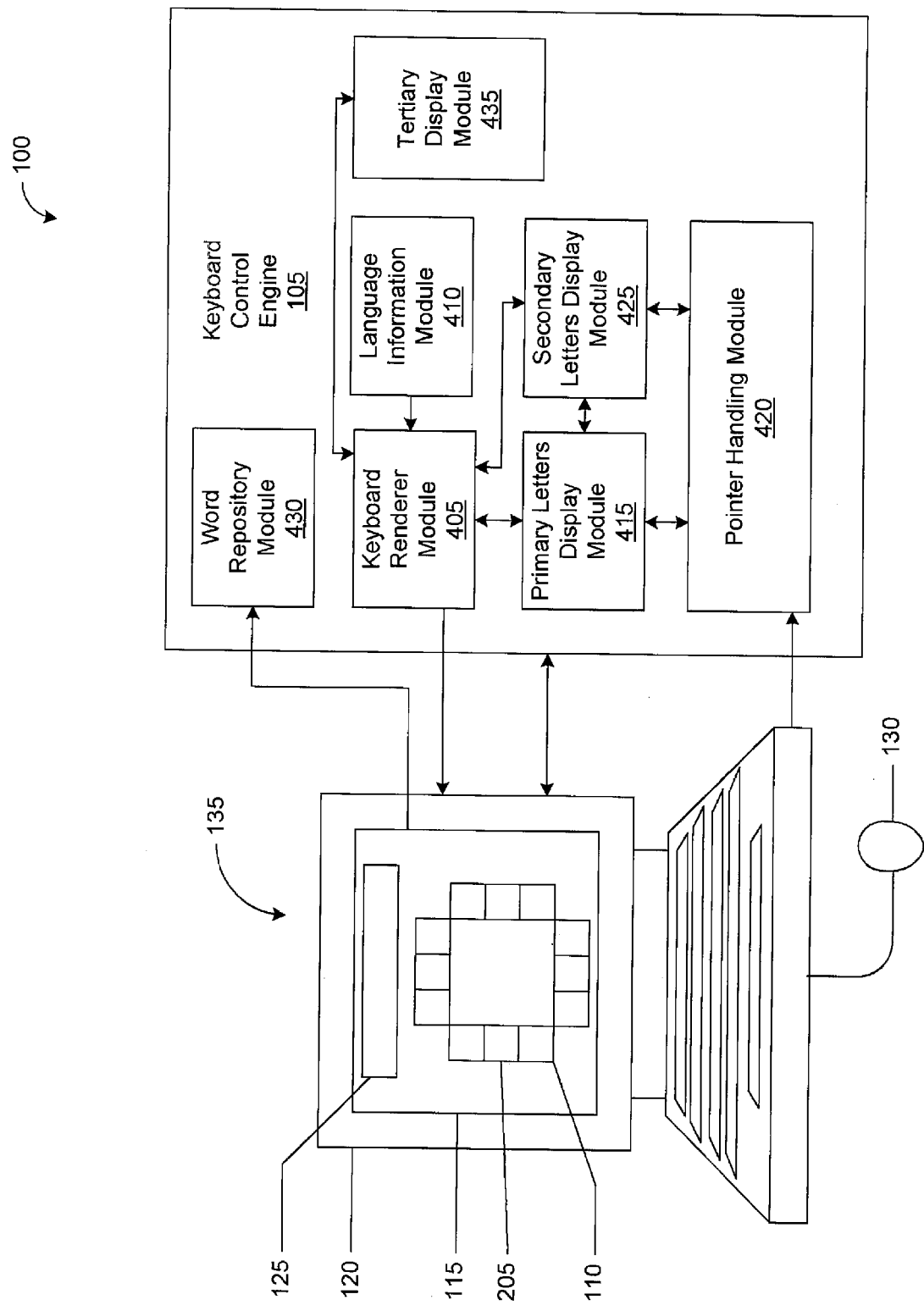
FIG. 4 is an example of a schematic of a system including a keyboard control engine.

FIG. 4 is a schematic of a system 100 including a KCE 105 in communication with a computer device 135 to facilitate the displaying a user interface 115. The user interface 115 includes an Indic language script keyboard 110 and a text box 125 in which letters of the Indic language script, selected by a user, are displayed.

The KCE 105 can include a keyboard renderer module 405 that can display the keyboard 110 in a user interface 115 in response to a request from a user. In some implementations, the keyboard renderer module 405 can present the keyboard 110 in one of several arrangements. One of the arrangements can be the circumferential arrangement of the primary objects 205 to form a region, such as shown in FIGS. 2A, 2B, 3A and 3B. Other arrangements can also be used.

The KCE 105 can include a primary letters display module 415 in communication with the keyboard renderer module 405. Based on the Indic language script, the primary letters display module 415 can display the primary letters of the language script in the primary objects 205 on the keyboard 110. In addition, the language rules, structure, and the like, of the Indic language script, including the primary letters, primary letter groups, and the like, can be stored in language information module 410. The keyboard renderer module 405 can determine the structure of the Indic language script, determine primary letter groups, and display primary object groups corresponding to the primary letter groups on the keyboard 110. In some implementations, the keyboard renderer module 405 can cause all primary objects 205 of the same primary object group to share a common appearance, e.g., have the same filled color.

The KCE 105 can include a pointer handling module 415, which can determine the position of a cursor, controlled by the pointing device 130, on the display device 120. For example, the pointing device 130 can be a mouse including a left mouse button, a right mouse button, and a scroll wheel. The user can change the position of the cursor on the display device 120 by moving the mouse. The pointer handling module 415 can detect when the cursor is positioned over the user interface 115 displaying the keyboard 110 and over a primary object 205 on the keyboard 110. In some implementations, the computer system 135 can detect the position of the pointer on the user interface 115 and transmit the position to the pointer handling module 420. The KCE 105 can be configured to display primary and secondary letters in response to the received pointer position. In other implementations, the KCE 105 can generate and transmit the keyboard 110, including the primary and secondary letters, to the computer system 135. The computer system 135 store the keyboard 115 in a non-volatile memory based storage device, e.g., hard disk, operatively coupled to the computer or in volatile memory buffer, e.g., random access memory (RAM), or both. The user interface 115 can be configured to communicate with the computer system 135 to detect changes in the position of the pointer and display relevant letters on the display device 120. In implementations where the keyboard 110 is stored in the memory buffer, the keyboard 110 can be erased from the memory buffer when the user interface 115 is de-activated, e.g., the user closes the user interface 115.

The KCE 105 can include a secondary letters display module 425 in communication with the keyboard renderer module 405, the primary letters display module 415 and the pointer handling module 420. When the pointer handling module 420 detects the positioning of the cursor on a primary object 205, the secondary letters display module 425 can cause the keyboard rendering 405 to display the second objects in the user interface 115. In some implementations, the secondary objects define the possible combinations of primary letters, representing consonants and dependent vowel markers. In some implementations, the keyboard renderer module 405 can display the secondary letters in corresponding secondary objects of a secondary object group, adjacent to the selected primary object 205, e.g., as an array of objects within the bounded region formed by the circumferential arrangement of the primary objects 205. The user can further select either the selected primary object 205 or one of the displayed secondary objects in the secondary object group. Additional display modules can also be used, e.g., a tertiary display module 435 to display tertiary objects defining characters that are based on a character of a selected secondary object according to a language rule.

In implementations in which the pointing device 130 is a mouse, the user can move the mouse to change the position of the cursor from the selected primary object 205 to one of the displayed secondary objects. In other implementations, the user can rotate the scroll wheel on the mouse to change the position of the cursor. The KCE 105 can detect the rotation of the scroll wheel and select a default primary object 205 as the first primary character. Alternatively, the KCE 105 can select the last primary object 205 that was selected by the user as the selected primary character when the KCE 105 detects scroll wheel rotation. When the KCE 105 detects the scroll wheel rotation, the KCE 105 can highlight the selected character and hide the arrow from display. Alternatively, the arrow can continue to be displayed on the screen. When the user scrolls the wheel to select a primary object 205, the corresponding secondary objects group 215 can be displayed. Further rotation of the scroll wheel can cause the highlighting of one of the objects in the secondary object group 215. The user can click the scroll wheel to select the highlighted secondary object causing the secondary character displayed in the selected object to be displayed in the text box 125. The user can click the left mouse button to navigate backwards from a secondary objects group 215 to the primary object 205 causing the secondary objects group 215 to be hidden from display. With further scrolling of the scroll wheel, the user can select another primary object 205.

In some implementations, the KCE 105 can highlight an object when the cursor is positioned on the object. For example, when the cursor is positioned on a primary object 205, the KCE 105 can fill the object with a color that can be easily discerned when compared to the other colors on the user interface 115. In addition, since the cursor is positioned on a primary object 205, the KCE 105 can display the associated secondary objects. Further, when the user moves the cursor, e.g., scrolls the mouse wheel, to position the cursor on a first secondary object, the KCE 105 can remove the easily discernible color from the previously highlighted primary object and fill the first secondary object on which the cursor is currently positioned. In some implementations, the cursor, e.g., an arrow, on the display device 120 can be hidden from display when the cursor is positioned on an object, in order to avoid confusion to a user about the selected object. The user can change the position of the cursor from the first secondary object to a subsequent secondary object by further rotating the scroll wheel on the mouse. Alternatively, or in addition, the user can change the position of the cursor by moving the mouse. In some implementations, scrolling the mouse forward and backward can enable the column-wise selection of objects. Moving the mouse to the left and to the right can enable the row-wise selection of objects.

A user can select either the selected primary object 205 or one of the displayed secondary objects, associated with the selected primary object 205, using the pointing device 130. For example, the user can rotate the scroll wheel on the mouse to position the cursor on a desired object. Since the KCE 105 highlights the object in which the cursor is positioned, the user can change the position of the cursor until the object that the user chooses is highlighted. The user can select the highlighted object using the pointing device 130, e.g., by clicking on one of the mouse buttons such as the left mouse button or the scroll wheel. In response to the user selecting the highlighted object, the KCE 105 can display the letter displayed in the highlighted object in a text box 125 in the user interface 115. Subsequently, the user can move the cursor to a subsequent secondary object in the secondary object group to select a subsequent letter. Alternatively, the user can move the cursor to a subsequent primary object 205 causing the KCE 105 to display a secondary object group associated with the subsequent primary object 205. The user can select either the subsequent primary object 205 or one of the displayed objects in the secondary object group. The KCE 105 can display the letter displayed in the selected object in the text box 125 and added to the previously selected letter. In this manner, the user can include letters in the Indic language script in the text box 125 to form one or more words.

The KCE 105 can include a word repository module 430 that can store the words input by the user. For example, each word in the text box 125 can be separated by a space. The KCE 105 can detect that a space has been entered in the text box 125, group the letters starting from the first letter in the text box 125 to the first space, or the letters between two spaces entered in the text box 125, or both, and store the grouped letters as a word in the word repository module 430.

Figure 5:
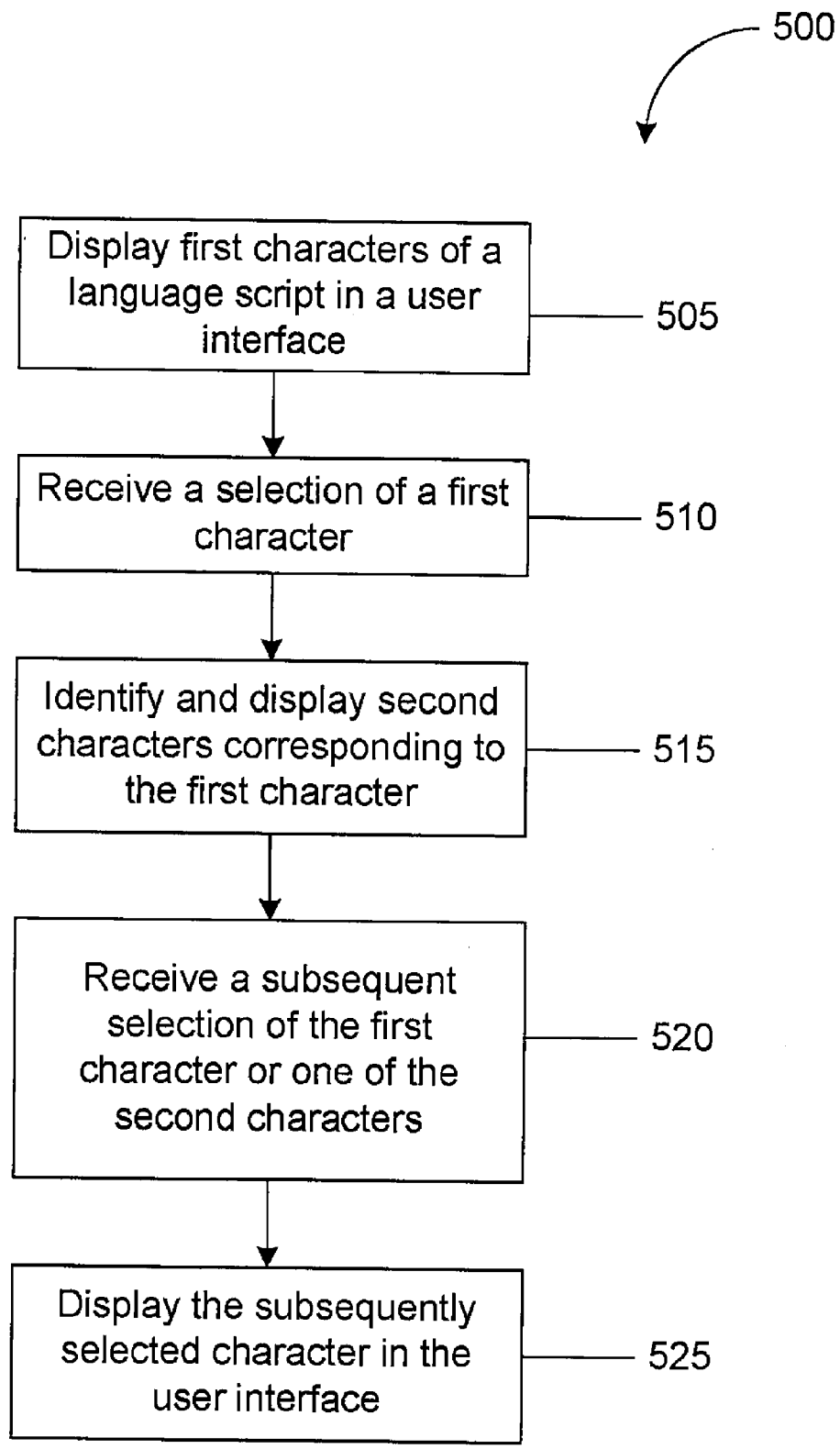
FIG. 5 is a flow chart of an example of a process for enabling entering characters in a language script.

FIG. 5 depicts a flow chart of an example of a process 500 for enabling entering characters in a language script in a text box in a user interface. In some implementations, the process 500 can display first characters of a language script in a user interface (505). For example, the keyboard renderer module 405 of the KCE 105 can display a keyboard 110 in a user interface 115 on a display device 120. The keyboard 110 can include first character objects, where each first character object can display a first character. In some implementations, the first character objects can be circumferentially arranged to define an interior region which can be rectangular. Further, first character object groups in the circumferential arrangement can be grouped based on rules of the language.

The process 500 can receive a selection of a first character (510). For example, the positioning of a cursor on the display device 120 on which the user interface 115, including the keyboard 110, is displayed, on a first character object, displaying a first character, can cause the selection. The KCE 105 can include a pointer handling module 420 which can detect the position of the cursor over a first character object to receive the selection.

In response to receiving the selection of a first character object, the process 500 can identify second characters that are variants of the first character and display the second characters of the language script corresponding to the first character (515). In some implementations, the second characters can be displayed in corresponding second character objects adjacent the selected first character object, wherein each of the second characters of the second character objects is a variant of the first character of the selected first character object. For example, the keyboard renderer module 405 in the KCE 105 can display the second character objects adjacent the selected first character object in the user interface 115 on the display device 120. In some implementations, the second character objects can be displayed as an array and, further, within the boundaries of the rectangular region defined by the circumferential arrangement of the first character objects. In some implementations, e.g., an Indic language script representation, the first character can correspond to a consonant in the language script, and the second character, which is a variant of the first character, can be a combination of the consonant and a dependent vowel marker. A language script can include multiple dependent vowel markers, and, consequently, multiple secondary characters. Other language rules can also be used.

The process 500 can receive a subsequent selection of the first character or one of the second characters (520). For example, the pointer handling module 420 in the KCE 105 can detect that the cursor is positioned over either the first character object corresponding to the first character or one of the second character objects corresponding to one of the second characters. Further, the KCE 105 can detect that the user has selected the character object, e.g., using a pointing device 130, such as a mouse. While the KCE 105 can detect the selection when the cursor is positioned over a character object, the KCE 105 can detect the subsequent selection when the user positions the cursor on the character object and clicks the pointing device 130.

The process 500 can display the subsequently selected character in the user interface (525). For example, the KCE 105 can display a text box 125 in the user interface 115 on the display device 120. Upon detecting a subsequent selection of either the first character object or one of the second character objects, the KCE 105 can display the character displayed in the selected character object in the text box 125 in the user interface 110. In some implementations, the first and second characters can define an Indic script where the first characters correspond to consonants and the second characters correspond to consonant dependent vowel markers.

The process 500 can be repeated to display multiple characters of the language script in the user interface 115. In addition, editing operations can be performed on the characters displayed in the text box 125, where the editing operations can include deleting a letter, inserting or deleting a space, cutting, copying, pasting letters, and the like. In some implementations, the process 500 can be operatively coupled with the processes performed by a search engine, where the letters entered in the text box 125 using process 500 can serve as search queries for a search conducted using the search engine.

Figure 6:
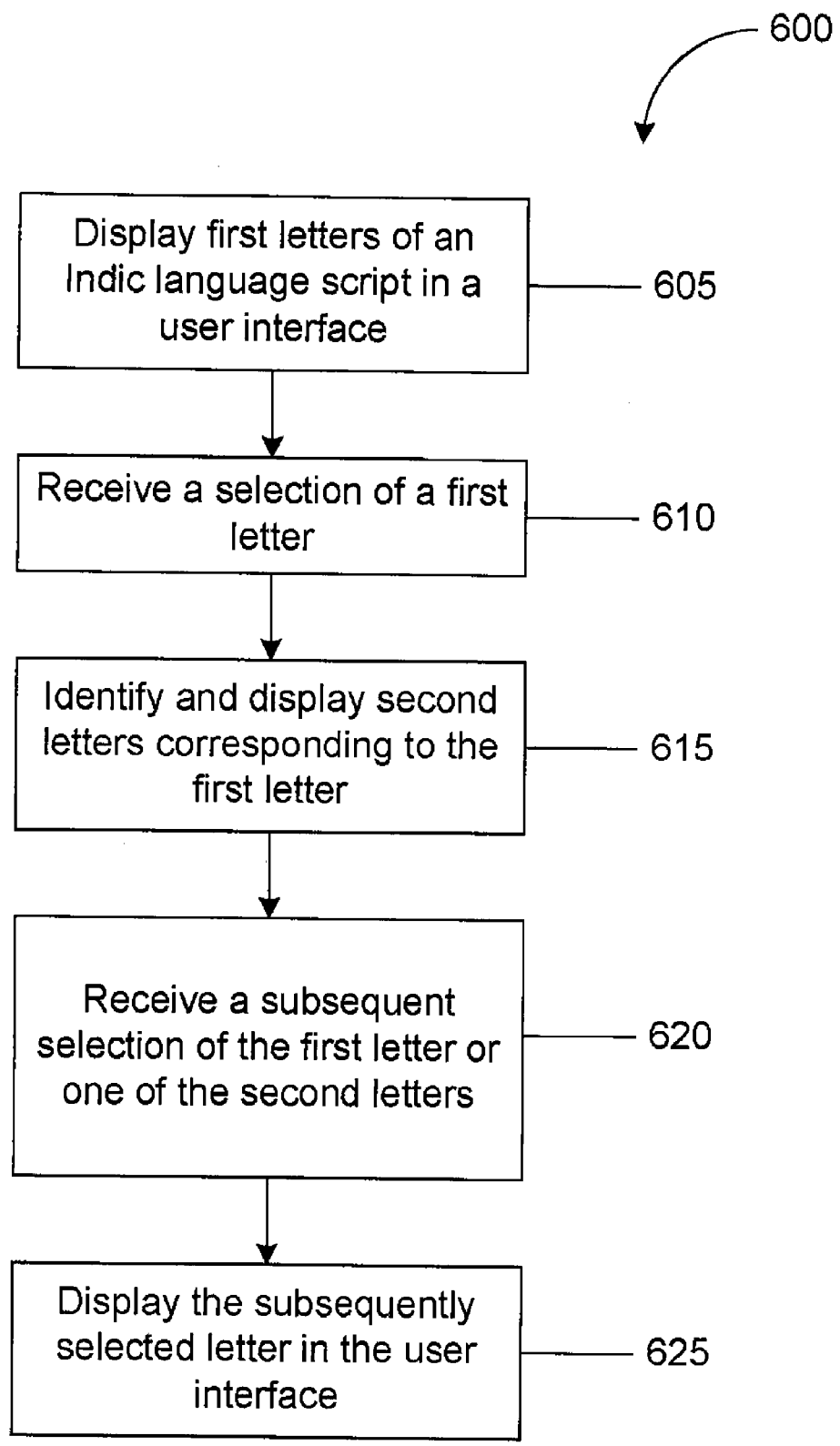
FIG. 6 is a flow chart of an example of a process for enabling entering letters in a language script.

FIG. 6 depicts a flow chart of an example of a process 600 for enabling entering letters in a language script in a text box in a user interface. In some implementations, the process 600 can display first letters of a language script, e.g., an Indic language script such as Hindi, in a user interface (605). For example, the keyboard renderer module 405 of the KCE 105 can display a keyboard 110 in a user interface 115 on a display device 120. The keyboard 110 can include first letter objects, where each first character object can display a first letter of the Indic language script. In some implementations, the first letter objects can be circumferentially arranged to define an interior region which can be rectangular. Further, first letter object groups in the circumferential arrangement can be grouped based on language rules of the language script.

The process 600 can receive a selection of a first letter (610). For example, the positioning of a cursor on the display device 120 on which the user interface 115, including the keyboard 110, is displayed, on a first letter object, displaying a first letter, can represent the selection. The KCE 105 can include a pointer handling module 420 which can detect the position of the cursor over a first letter object to receive the selection.

In response to receiving the selection of a first letter object, the process 600 can identify second letter objects that include letters that are variants of the first letter in the first letter object, and display second letters of the language script corresponding to the first letter (615). In some implementations, the second letters can be displayed in corresponding second letter objects proximate to, e.g., adjacent, the selected first letter object, wherein each of the second letters of the second letter objects is a variant of the first letter of the selected first letter object. For example, the keyboard renderer module 405 in the KCE 105 can display the second letter objects adjacent the selected first letter object in the user interface 115 on the display device 120. In some implementations, the second letter objects can be displayed as an array and, further, within the boundaries of the rectangular region defined by the circumferential arrangement of the first letter objects.

The process 600 can receive a subsequent selection of the first letter or one of the second letter (620). For example, the pointer handling module 420 in the KCE 105 can detect that the cursor is positioned over either the first letter object corresponding to the first letter or one of the second letter objects corresponding to one of the second letter. Further, the KCE 105 can detect that the user has selected the letter object, e.g., using a pointing device 130, such as a mouse. While the KCE 105 can detect the selection when the cursor is positioned over a letter object, the KCE 105 can detect the subsequent selection when the user positions the cursor on the letter object and clicks the pointing device 130. The process 500 can display the subsequently selected letter in the user interface (525). For example, the KCE 105 can display a text box 125 in the user interface 115 on the display device 120. Upon detecting a subsequent selection of either the first letter object or one of the second letter objects, the KCE 105 can display the letter displayed in the selected letter object in the text box 125 in the user interface 110.

Figure 7A:
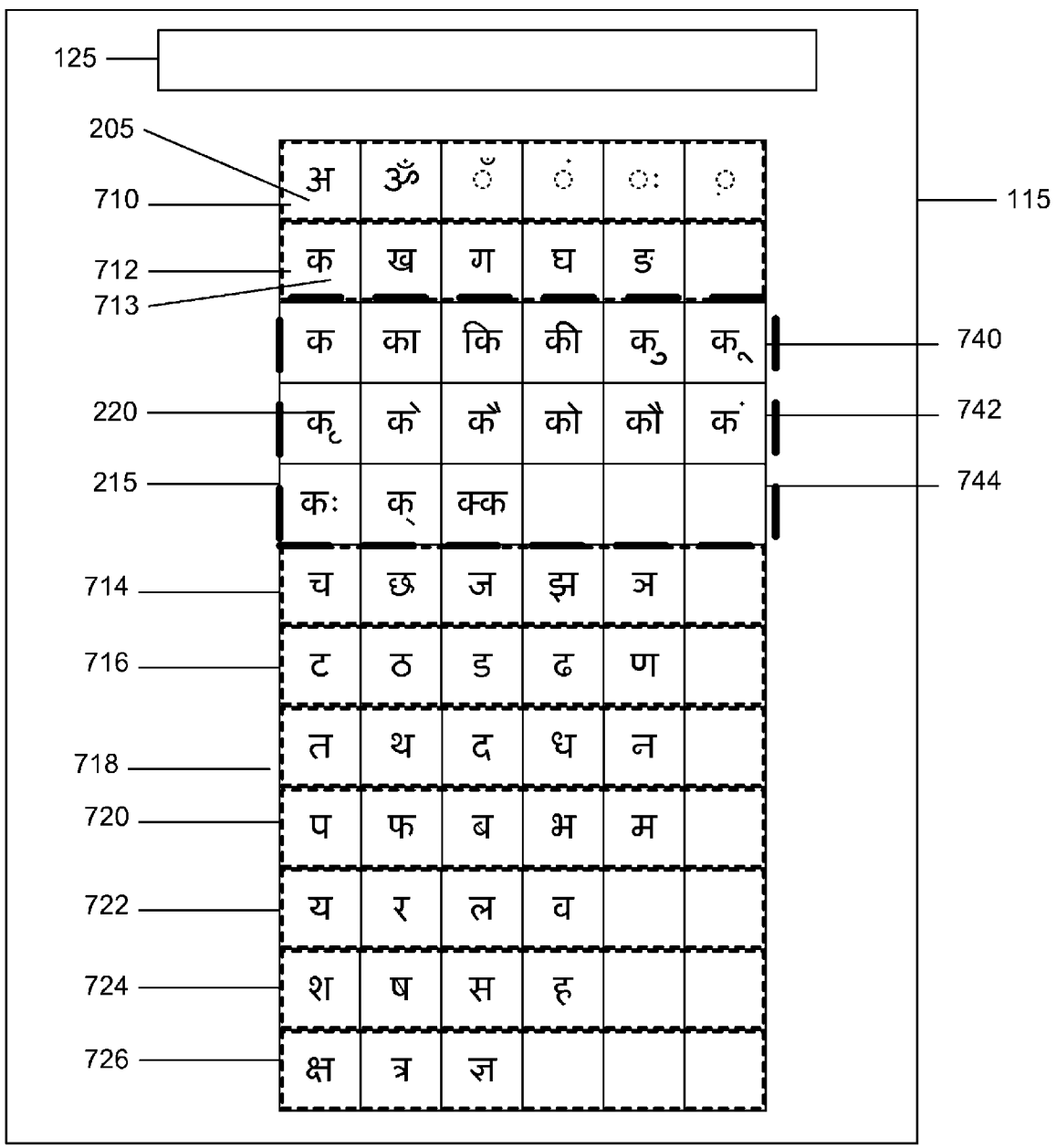
FIGS. 7A and 7B are example user interfaces for keyboards for entering text in an Indic language script.
Figure 7B:
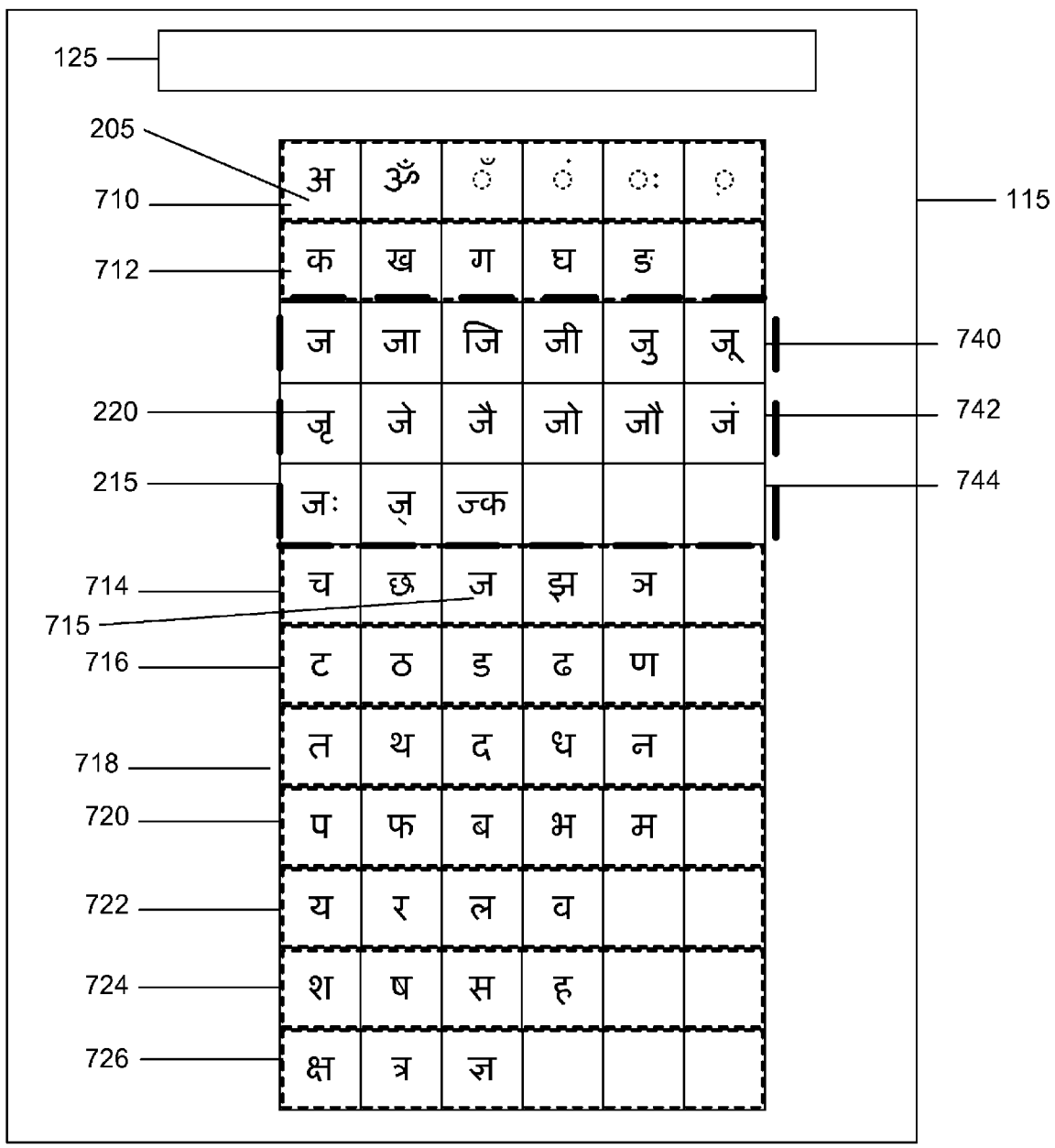

FIGS. 7A and 7B depict example user interfaces 115 displaying a keyboard 110 for entering characters in an Indic language script, e.g., Hindi. In some implementations, all primary objects 205 that are grouped to form a primary object group can be displayed in a first primary object row 710. A second primary object group can be displayed in a second primary object row 712 vertically displaced from the first primary object row 710, and so on, e.g., rows 710, 712, 714, 716, 718, 720, 722, 724 and 726 are displayed. In this manner, the primary objects 205, displaying the primary letters, can be displayed in the user interface 115 as an array, where each row 710, 712, 714, 716, 718, 720, 722, 724 and 726 of the array defines a primary object group.

The user can select a primary letter by positioning the cursor on the primary object 205 displaying the primary letter. In response, the secondary object group 215 displaying the secondary letters that are variants of the primary letter can be displayed in the user interface 115. The secondary letters can be displayed as an array of objects, where the array representing the objects can be inserted between the rows, e.g., rows 712 and 714, of the primary letters group 210 such that both the primary objects 205 and the secondary objects 220 are simultaneously visible. In some implementations, the secondary object group 215 can be displayed over one or more primary objects 205, thereby causing the primary objects 205 to be hidden from display. When the user moves the pointer away from the primary object 205, that caused the secondary object group 215 to be displayed, the secondary object group 215 can be hidden from display and the hidden primary objects 205 can be displayed on the user interface 115.

As illustrated in FIG. 7A, in some implementations, the secondary object group 215 can include multiple rows 740, 742 and 744 of secondary objects 220 that are inserted proximate to, e.g., below, the primary object group row in which the selected primary object 205 is displayed. In FIG. 7A, for example, the secondary objects 220 include characters that are the character in the primary object 713 in row 712.

As illustrated in FIG. 7B, in other implementations, the secondary object group 215 can include multiple rows of secondary objects 220 that are inserted proximate to, e.g., above, the primary object group row, e.g., row 714, in which the selected primary object 205 is displayed. In FIG. 7B, for example, the secondary objects 220 include characters that are the character in the primary object 715 in row 714. In such implementations, the remaining primary object group rows, e.g., 714, 716, 718, 720, 722, 724 and 726 can be automatically re-positioned, e.g., shifted downward, to accommodate displaying the secondary object group 215 in conjunction with the primary object rows 710, 712, 714, 716, 718, 720, 722, 724 and 726.

Figure 8:
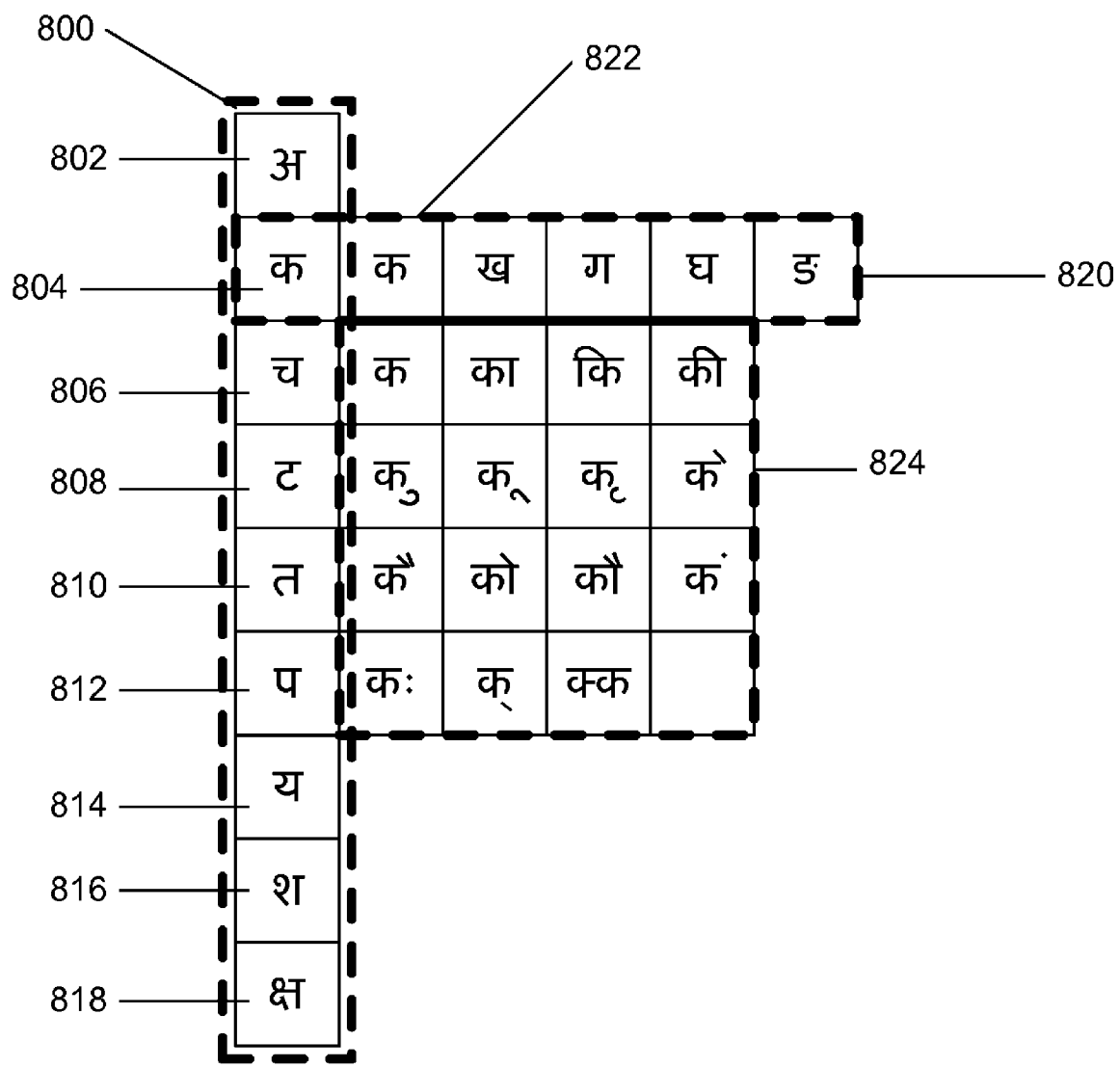
FIG. 8 is an example user interface for a keyboard for entering text in an Indic language script.

FIG. 8 depicts an example of a schematic of a user interface 800 where primary letters are displayed in a column. In some implementations, only the first primary letter of each primary letters group can be displayed on the display device. For example, as illustrated in FIG. 8, the primary objects 802, 804, 806, 808, 810, 812, 814, 816, and 818 can display the first primary letter of corresponding primary letters groups. The primary objects 802-818 can be arranged in a column 800. When a user positions a cursor over one of the displayed primary objects displaying a primary letter, the primary letters group, including all the primary letters, can be displayed in a row adjacent to the primary object. For example, when the cursor is positioned over the primary object 804, the primary letters group 820 can be displayed adjacent to the primary object 804. In some implementations, the primary letters group 820 can display all the letters of the group including the primary letter that was already displayed on the display device. In other implementations, the primary letters group 820 can display the letters of the group 820 other than the primary letter already displayed on the display device.

Subsequently, when the user positions the cursor over one of the primary letters in the primary letters group 820, the corresponding secondary letters group can be displayed. For example, when the user positions the cursor over the primary object 822 of the primary letters group 820, the secondary letters group 824 displaying the combination of the primary letter in the primary object 822 and dependent vowel markers can be displayed in an array proximate to, e.g., adjacent to the primary letters group 820. Subsequently, when the user de-selects the primary object 822 and re-positions the cursor over another primary object in the primary letters group 820, secondary letters corresponding to the newly selected primary letter can be displayed on the display device. Further, when the user re-positions the cursor over one of the primary letters 802, 806, 808, 810, 812, 814, 816, or 818, the secondary letters group 824 and the primary letters group 820 can be hidden from display. The primary letters group including the primary letter displayed in the newly selected primary object can be displayed in the display device.

In some implementations, the number of columns across which the number of secondary objects 220 are displayed can equal the number of columns in each object group row. Alternatively, the secondary objects 220 can be displayed in more or less columns than the number of columns in the object group row. In some implementations, all objects of the secondary object group can be displayed in one row, where the one row can be inserted between two primary object group rows.

In some implementations, the keyboard 110 can include one or more third characters that can be variants of the second characters. For example, for languages that include a third character that is a variant of the second character, tertiary objects displaying the third characters can be displayed on the user interface when the cursor is positioned over one of the second characters. In this manner, additional characters that are variants of one of the displayed characters can be nested in the keyboard. In addition, the display of the keyboard can be re-arranged, e.g., one or more objects can be re-positioned, such that when a character is displayed on the user interface, all characters in the hierarchy above the displayed character are also displayed on the user interface. For example, if a third character is displayed on the screen, the second characters, including the second character of which the third character is a variant, and the primary characters, including the primary character of which the secondary character is a variant, can be displayed on the user interface.

In some implementations, the arrangement of the objects in the keyboard can match a manner in which the language is written. For example, for languages where the letters are written from left to right, e.g., Hindi, Tamil, and the like, the objects displaying the primary letters can be arranged in a clockwise direction along the circumferential region. Alternatively, for languages where the letters are written from right to left, e.g., Urdu, Arabic, and the like, the objects displaying the primary letters can be arranged in a counter-clockwise direction along the circumferential region.

Figure 9A:
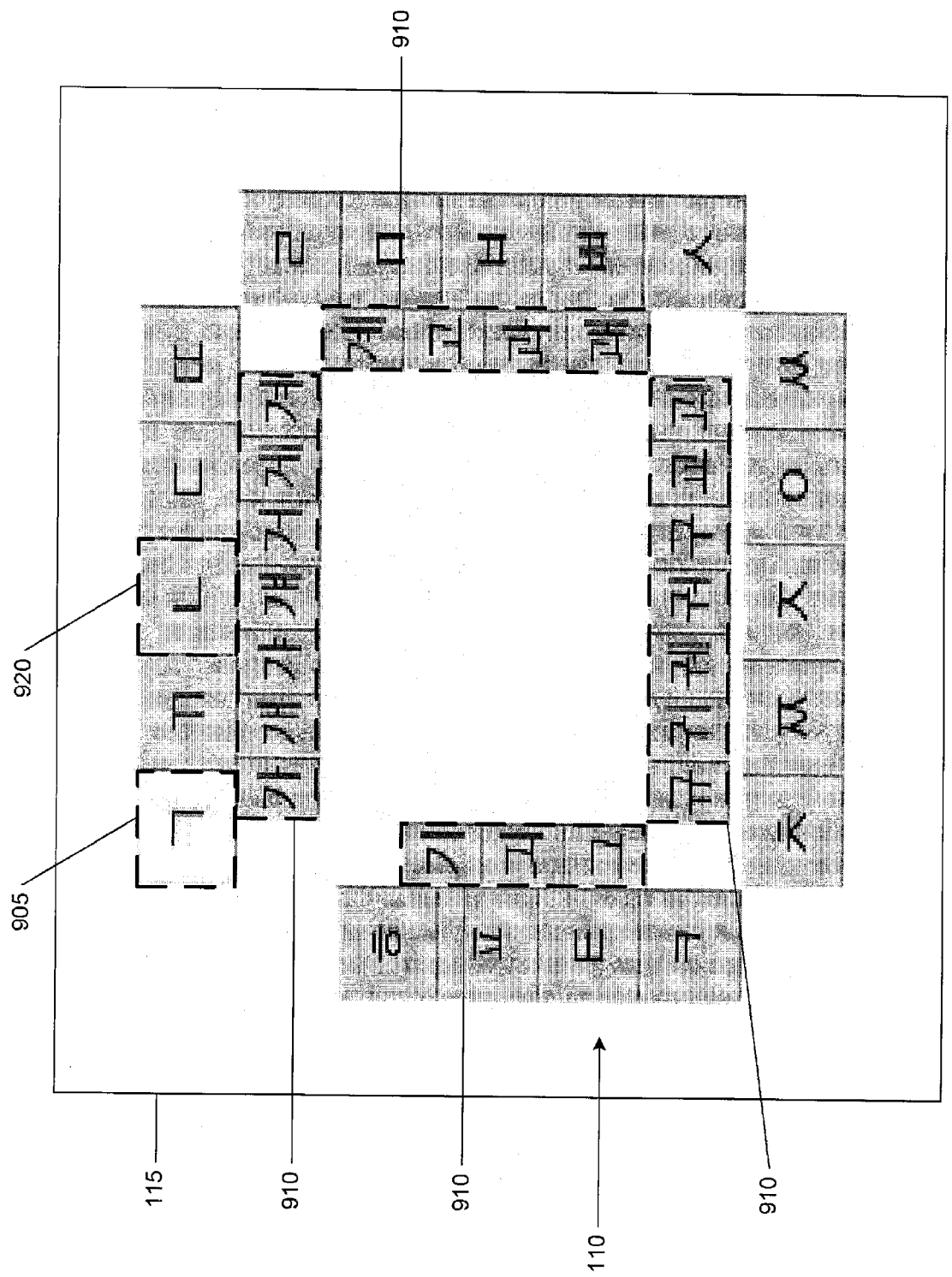
FIGS. 9A and 9B depict an example virtual keyboard for entering text in a Korean language script.

FIG. 9A depict an example of a virtual keyboard 110 for entering text of a Korean language script. The keyboard 110 can be displayed in a user interface 115. The primary characters of the Korean language script can be displayed in primary objects, including primary object 905. In some implementations, the primary objects can be circumferentially arranged to define a rectangular region. When a user positions a cursor over the primary object 905, in response, a secondary object group 910, including one or more secondary objects, can be displayed proximate to, e.g., in circumferential disposition, to the primary object 905. The secondary objects can display Korean script characters that are associated with the primary character displayed in the primary object 905. For example, the secondary characters in the secondary object group 910 can be formed by the combination of the primary character in the primary object 905 and other Korean script characters, where the combinations are permissible according to one or more Korean language rules. As shown, the secondary object group 910 can be proximally positioned within the circumferential region bounded by the primary objects. Also, the secondary objects in the secondary object group 910 can be positioned such that all primary objects as well as all characters of the secondary object group 910 are visible in the user interface 110. Subsequently, the user can select either the primary object 905 or one of the secondary objects in the secondary object group 910 by positioning the cursor over the object. When the user moves the cursor from the primary object 905 to a new primary object 920, the primary object 905 can be de-selected. The primary object 920 can then be selected and a new secondary object group including secondary characters associated with the new primary character can be displayed proximate to the new primary object 920.

Figure 9B:
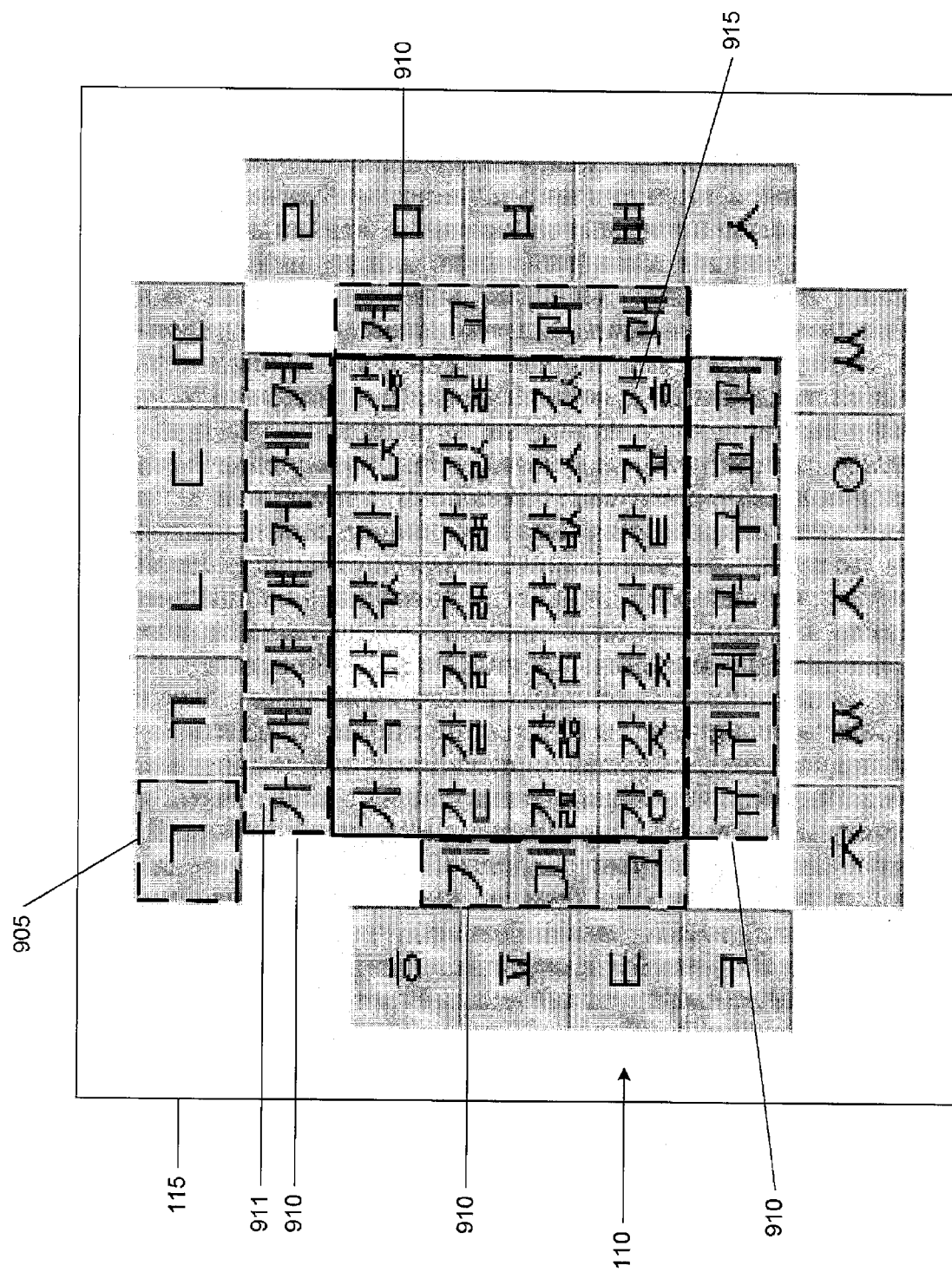

FIG. 9B depicts a subsequent display of a tertiary objects group 915 in response to a selection of one of the second objects, e.g., secondary object 911, in the secondary object group 910. For example, the user can position the cursor over one of the secondary objects in the secondary objects group 915, and the tertiary objects group 915 can be displayed proximate to, e.g., within, the secondary objects group 910. The tertiary objects group 915 can include one or more tertiary objects that display tertiary characters that are associated with the selected secondary character. For example, the tertiary character can be formed by the combination of the selected secondary character and permissible Korean characters based on the rules of the Korean language script. When a user positions the cursor over one of the tertiary objects in the tertiary objects group 915, the tertiary object can be selected. In this manner, the user can select characters of the Korean language script.

Implementations of the subject matter and the functional operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, near-touch input, or tactile input.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

A number of implementations have been described. Nevertheless, it will be understood that various modifications may be made without departing from the spirit and scope of the disclosure. For example, in some implementations, a keyboard 110 can be previously created and stored for each Indic language script, where the keyboard 110 can display primary objects for all primary letters of the language script, as well as group the primary objects to form primary object groups. In other implementations, based on the language script detected by the language information module 410, the primary letters in the Indic language script, and rules and structure of the language script stored in the language information module 410, a keyboard 110 can be generated for display in the user interface 115 on the display device 120. Once generated, the keyboard 110 can be stored and retrieved for future use.

In some implementations, the user interface can include a list of language scripts, e.g., in a drop down menu. The user can select one of the language scripts in the drop down menu, and, in response, the keyboard corresponding to the selected language script can be displayed. In addition, in the drop down menu, the name of each language script can be written in letters of the corresponding language script to enable a user who is familiar only with one language script to select that language script from the drop down menu. In some implementations, an array of primary letters can be displayed such that each primary letter is displayed in a corresponding primary object, and each primary letter corresponds to an Indic language script. The user can identify the language based on the displayed primary letter. When the user positions the cursor over the primary object displaying a primary letter, all other primary objects can be hidden from display, and the virtual keyboard corresponding to the Indic language of the selected primary letter can be displayed on the display device. In this manner, the user can cause an Indic language keyboard to be displayed on the display device by selecting a primary object from an array of primary objects, where each primary object in the array displays a primary letter from a different Indic language script.

In some implementations, the words in the word repository module can be used to auto-fill the text box in the user interface. For example, the user can form a first word, consisting of 3 letters, and the word can be stored in the word repository module. Subsequently, when the first letter that a user selects for display in the text box matches the first letter of the stored word, then the stored word can be displayed adjacent to the text box or the keyboard or at any other part of the user interface. If the user selects the displayed stored word, then the stored word is displayed in the text box. Alternatively, the user can ignore the stored word and either re-enter the stored word by selecting the same 3 letters or form a new word by selecting different letters. The KCE can be configured to compare the formed word with the word repository module, and, store the formed word, unless the formed word is already stored, in the repository.

In some implementations, the input device to select the objects can be different from a pointing device. For example, the input device can be a keyboard operatively coupled to the computer to which the display device is operatively coupled, a stylus, a user's finger, or combinations of devices. The user can use a mouse to position a cursor on an object and use the keyboard to select the object, e.g., by pressing the "Enter" key. In some implementations, the user can use a stylus to select objects, where a single touch on a primary object can represent a selection to display associated secondary objects and two touches on either the primary object or a displayed corresponding secondary object can represent a selection of a letter for entry in the text box. Alternatively, selection can be altered by the duration of contact between the stylus and the object. In some implementations, the user interface can be displayed on a display device other than the screen of a computer. For example, the user interface including the keyboard can be displayed in the screen of a mobile device, e.g., a cellular telephone. A user can use a stylus, the user's finger, the keypad on the cell phone, or combinations of the same, to access the objects in the cell phone display. In some implementations, the mobile device can be connected to the KCE 105 over a network, e.g., a cellular telephone network. A user of the mobile device can request that the keyboard be displayed on the display of the mobile device by transmitting a request to the KCE 105. In response, the KCE 105 can transmit the user interface including the keyboard to the mobile device.

In some implementations, the KCE 105 can be configured to display words, portions of words, word phrases, and the like, in objects, as part of the keyboard, to enable a user to enter more than one letter at a time in the text box with a single selection. The words, portions of words, word phrases, and the like, can be chosen based on factors including one or more of previous entries by the user into the text box, from the word repository module, based on grammatical rules of the Indic language, words frequently used by the user, words frequently used in the Indic language script, and the like. In addition, based on the rules of the Indic language script, e.g., grammatical rules, one or more primary objects or secondary objects can be removed from display, in response to the previous selections that are displayed in the text box. For example, the rules of the Indic language may prohibit a second letter to follow a first letter. In such an example, the KCE can recognize the selection of the first letter, and de-activate or remove from display, the object displaying the second letter. In some implementations, the words formed by the combination of letters selected for display in the text box can be used as a search terms in a search query. Alternatively, the text box can be a text editor. In implementations where the text box entry is used in a search query, the KCE 105 can be operatively coupled to a search engine that can be configured to return search results in the Indic language script of the letters in the text box.

In some implementations, the representation of the keyboard where the primary objects are circumferentially arranged can represent a beginner level user of the Indic language script keyboard. Over time, as the user becomes familiar with the keyboard, the keyboard display can be upgraded to the representation where the primary object groups are arranged in rows and secondary objects are inserted between the primary object group rows. Thus, while the circumferential arrangement can represent a beginner keyboard, the object group row based display can represent an expert mode.

In some implementations, all objects in a keyboard can be of the same dimensions. Alternatively, the size of objects in a first keyboard can be different from those in a second keyboard based on the Indic language script of the keyboard. Further, within the same keyboard, the size of objects can be different based on the symbol of the dependent vowel marker associated with a consonant to represent a letter that is associated with the consonant. In some implementations, the size of the letters, e.g., the font size, in each object can be individually altered to minimize the total space occupied by the keyboard. In some implementations, a space object representing a space between two letters and a backspace object representing a "Backspace" to delete the letter immediately preceding the cursor can be included in the keyboard. The user can insert a space between two letters or delete the last entered letter by selecting the space object and the backspace object, respectively. In some implementations, the space object and the backspace object can be included at only one location in the keyboard. In other implementations, the space object and the backspace object can be included with every secondary object group in the keyboard. Further, objects representing other editing operations, such as cut, copy, paste, and the like, can also be included in the keyboard in the user interface.

In some implementations, each language script selected from a drop down menu to display a keyboard of the selected Indic language script can be represented by an individual web page of a web site, where each web page can be bookmarked for convenient access. In some implementations, pieces of HTML code can be included in the user interface adjacent to the keyboard. For example, a piece of HTML can cause the display of advertisements related to the text previously entered or currently being entered in the text box.

Accordingly, other embodiments are within the scope of the following claims.

What is claimed is:

1. A computer-implemented method comprising:
    displaying, in a user interface, first objects displaying respective first characters, each first character being a consonant of a language script, wherein the first objects are arranged circumferentially to define an interior region in which no other objects displaying characters are displayed;
    receiving a single selection of one of the first objects that displays one of the first characters, wherein the single selection causes the displayed one of the first characters to be a selected first character; and
    in response to receiving the single selection, displaying, in the user interface within the interior region, and while continuing to display the first objects, other, second objects displaying respective other single characters of the language script, each other, single character being a combination of the consonant of the selected first character, and a dependent vowel marker that, according to a language rule, is valid for the consonant of the selected first character.

2. The method of claim 1, wherein displaying the other, second objects comprises displaying the other, second objects proximate to the selected first object.

3. The method of claim 1 further comprising:
    receiving a selection of one of the other, second objects; and
    displaying a single character displayed in the selected other, second object as an input character in the user interface.

4. The method of claim 3 further comprising:
    displaying, in the user interface, a third object displaying a symbol of the language script that is combinable with any character of the language script according to the language rule; and
    receiving a selection of the third object; and
    displaying, in the user interface, a single character that is a combination of the other, single character displayed as the input character and the symbol.

5. The method of claim 1, wherein the first objects are circumferentially arranged to define a rectangle.

6. The method of claim 5, further comprising defining first character groups in the circumferentially arranged first objects, each first character group consisting of a plurality of characters according to a letter grouping based on the language rule.

7. The method of claim 1, wherein the language script is an Indic script, and wherein the language rule defines permissible consonant and dependent vowel marker combinations.

8. The method of claim 1, wherein displaying, in the user interface, first characters comprises displaying five or more characters.

9. The method of claim 1, wherein displaying, in the user interface, first characters comprises displaying a plurality of characters that are all consonants of the language script.

10. The method of claim 1, further comprising:
    displaying, in the user interface, an additional object displaying an additional character that is a vowel of the language script;
    receiving a selection of the additional object; and
    in response to receiving the selection of the additional object, displaying, in the user interface and within the interior region, other, additional objects that display additional characters that are all the vowels of the language script.

11. The system of claim 1, the operations further comprising:
    receiving a selection of one of the other, second objects; and
    displaying a single character displayed in the selected other, second object as an input character in the user interface.

12. The system of claim 11, the operations further comprising:
    displaying, in the user interface, a third object displaying a symbol of the language script that is combinable with any character of the language script according to the language rule; and
    receiving a selection of the third object; and
    displaying, in the user interface, a single character that is a combination of the other, single character displayed as the input character and the symbol.

13. Software stored in a non-transitory computer readable medium and comprising instructions that are configured to cause a processing device to perform the operations comprising:
    displaying, in a user interface, first objects displaying first characters, each first character being a consonant of a language script, wherein the first objects are arranged circumferentially to define an interior region in which no other objects displaying characters are displayed;
    receiving a single selection of one of the first objects that displays one of the first characters that is a consonant character; and
    in response to receiving the single selection, displaying, in the user interface within the interior region, and while continuing to display the first objects, other, second objects displaying single characters of the language script proximate the selected first object, wherein each of the single characters is a combination of a consonant of the selected first character and a dependent vowel marker that, according to the language rule, is valid for the consonant of the selected first character.

14. The software of claim 13, the operations further comprising:
    receiving a selection of one of the other, second objects that displays one of the single characters; and
    displaying the selected single character displayed in the selected second object as an input character in the user interface.

15. The software of claim 13, the operations further comprising:
    displaying, in the user interface, a third object displaying a symbol of the language script that is combinable with any character of the language script according to the language rule;
    receiving a selection of the third object;

displaying, in the user interface, a single character that is a combination of the other, single character displayed as the input character and the symbol.

16. The software of claim 13, wherein the language script is an Indic script.

17. The software of claim 13, wherein displaying, in the user interface, first characters comprises displaying a plurality of characters that are all consonants of the language script.

18. The system of claim 17, wherein the first objects are circumferentially arranged to define a rectangle.

19. A computer-implemented method comprising:
displaying consonants of an Indic language script in corresponding first objects in a user interface, wherein the first objects are arranged circumferentially to define an interior region in which no other objects displaying characters are displayed;
in response to detecting a first single selection of a first object, displaying, within the interior region while continuing to display the first objects, second letters in corresponding second objects, wherein each of the second letters is a combination, according to a language rule of the Indic language script, of the consonant displayed in the first object and a dependent vowel marker in the Indic language script, wherein the combination of the consonant and a dependent vowel marker is a single letter in the Indic language script; and
in response to detecting a subsequent selection of one of the selected first object or one of the displayed second objects, displaying the letter corresponding to the subsequently selected object in another user interface.

20. The method of claim 19, wherein the consonants of the Indic language script displayed in the user interface are all the consonants of the Indic language script.

21. The method of claim 20, wherein all the consonants of the Indic language are divided into a plurality of consonant groups according to the language rule, each consonant group including a plurality of consonants, the method further comprising:
displaying each consonant group in a corresponding object group that includes a plurality of objects, each object displaying a consonant in the consonant group; and
highlighting each object group by a corresponding object group indicator.

22. The method of claim 19, wherein the circumferential region defines a rectangular region.

23. The method of claim 19, wherein the other user interface is a text box.

24. Software stored in a non-transitory computer readable medium and comprising instructions that upon execution cause a processing device to perform operations including:
displaying consonants of an Indic language script in corresponding first objects in a user interface, wherein the first objects are arranged circumferentially to define an interior region in which no other objects displaying characters are displayed;
in response to detecting a first single selection of a first object, displaying, within the interior region and while continuing to display the first objects, second letters in corresponding second objects, wherein each of the second letters is a combination, according to a language rule of the Indic language script, of the consonant displayed in the first object and a dependent vowel marker in the Indic language script, wherein the combination of the consonant and a dependent vowel marker is a single letter in the Indic language script; and
in response to detecting a subsequent selection of one of the selected first object or one of the displayed second objects, displaying the letter corresponding to the subsequently selected object in another user interface.

25. The software of claim 24, wherein the consonants of the Indic language script displayed in the user interface are all the consonants of the Indic language script.

26. The software of claim 25, wherein all the consonants of the Indic language are divided into a plurality of consonant groups according to the language rule, each consonant group including a plurality of consonants, the operations further comprise:
displaying each consonant group in a corresponding object group that includes a plurality of objects, each object displaying a consonant in the consonant group; and
highlighting each object group by a corresponding object group indicator.

27. A graphical user interface system, comprising:
a keyboard control engine configured to generate a virtual keyboard, the keyboard control engine including:
a keyboard rendering module configured to generate primary keyboard objects arranged circumferentially to define an interior region in which no other objects displaying characters are displayed and secondary keyboard objects selectable by a user input device and generate a virtual keyboard displaying the primary keyboard objects and displaying the secondary keyboard objects adjacent a selected primary keyboard object within the interior region while continuing to display the primary keyboard objects;
a primary letters display module in data communication with the keyboard rendering module and configured to display in the primary keyboard objects all consonants of an Indic language script;
a language information module in data communication with the keyboard rendering module and configured to:
receive a single selection of a primary keyboard object displaying a first character, and
in response to receiving the single selection of the primary keyboard object, identify the first character displayed in a selected primary keyboard object and identify second characters, wherein each second character is a combination of the consonant and a dependent vowel marker in the language script, wherein each second character is valid according to a language rule of the Indic language script; and
a secondary letters display module in data communication with the keyboard rendering module and configured to display in each secondary keyboard object, the identified second characters.

28. A system comprising:
one or more data processing apparatus; and
a non-transitory computer-readable medium storing computer software instructions executable by the one or more data processing apparatus to perform operations comprising:
displaying, in a user interface, first objects displaying respective first characters, each first character being a consonant of a language script, wherein the first objects are arranged circumferentially to define an interior region in which no other objects displaying characters are displayed;
receiving a single selection of one of the first objects that displays one of the first characters, wherein the single selection causes the displayed one of the first characters to be a selected first character; and in response to receiving the single selection, displaying, in the user interface within the interior region, and while continuing to display the first objects, other, second objects displaying respective other single characters of the language script, each other, single character being a combination of the consonant of the selected first character, and a dependent vowel marker that, according to a language rule, is valid for the consonant of the selected first character.

29. The system of claim 28, wherein displaying the other, second objects comprises displaying the other, second objects proximate to the selected first object.

30. The system of claim 18, further comprising defining first character groups in the circumferentially arranged first objects, each first character group consisting of a plurality of characters according to a letter grouping based on the language rule.

31. The system of claim 17, wherein the language script is an Indic script, and wherein the language rule defines permissible consonant and dependent vowel marker combinations.

* * * * *

UNITED STATES PATENT AND TRADEMARK OFFICE
CERTIFICATE OF CORRECTION

| | | |
|---|---|---|
| PATENT NO. | : 8,253,694 B2 | Page 1 of 1 |
| APPLICATION NO. | : 11/833901 | |
| DATED | : August 28, 2012 | |
| INVENTOR(S) | : Raghunath et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1063 days.

Signed and Sealed this
Twenty-ninth Day of December, 2015

Michelle K. Lee
*Director of the United States Patent and Trademark Office*